US012812684B2

(12) United States Patent
Kim et al.

(10) Patent No.: US 12,812,684 B2
(45) Date of Patent: Nov. 24, 2026

(54) SYCHRONIZATION METHOD AND APPARATUS FOR WIRELESS TRANSMISSION BETWEEN TERMINAL AND MULTIPLE TRANSMISSION AND RECEPTION POINTS IN WIRELESS COMMUNICATION SYSTEM

(71) Applicant: ELECTRONICS AND TELECOMMUNICATIONS RESEARCH INSTITUTE, Daejeon (KR)

(72) Inventors: Yong Sun Kim, Daejeon (KR); Kap Seok Chang, Daejeon (KR); Young Jo Ko, Daejeon (KR); Cheul Soon Kim, Daejeon (KR); Sung Hyun Moon, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 382 days.

(21) Appl. No.: 18/493,411

(22) Filed: Oct. 24, 2023

(65) Prior Publication Data

US 2024/0188143 A1 Jun. 6, 2024

(30) Foreign Application Priority Data

Oct. 25, 2022 (KR) ........................ 10-2022-0138415
Oct. 20, 2023 (KR) ........................ 10-2023-0141391

(51) Int. Cl.
*H04W 74/0833* (2024.01)
*H04W 74/00* (2009.01)

(52) U.S. Cl.
CPC ..... *H04W 74/0833* (2013.01); *H04W 74/006* (2013.01)

(58) Field of Classification Search
CPC ........................ H04W 74/0833; H04W 74/006
USPC .......................................................... 370/329
See application file for complete search history.

(56) References Cited

U.S. PATENT DOCUMENTS

| | | | | |
|---|---|---|---|---|
| 10,433,301 | B2 | 10/2019 | Guo et al. | |
| 11,528,106 | B2 | 12/2022 | Park et al. | |
| 2020/0153500 | A1 | 5/2020 | Kim et al. | |
| 2022/0061009 | A1 | 2/2022 | Kim et al. | |
| 2022/0116097 | A1 | 4/2022 | Marinier et al. | |
| 2022/0231734 | A1 | 7/2022 | Jung et al. | |
| 2022/0304036 | A1 | 9/2022 | Zhang et al. | |
| 2022/0330192 | A1* | 10/2022 | Zhang | H04W 56/0045 |
| 2024/0171997 | A1* | 5/2024 | Du | H04B 7/06952 |
| 2025/0358863 | A1* | 11/2025 | Cao | H04L 5/0035 |

* cited by examiner

*Primary Examiner* — Chi Tang P Cheng
(74) *Attorney, Agent, or Firm* — Sughrue Mion, PLLC

(57) ABSTRACT

A method of a UE may comprise: receiving a first SSB search request message including SSB search options through a first TRP in a connected state with a BS through the first TRP connected below the BS; searching for a plurality of SSBs based on the SSB search options; and in response to presence of a beam transmitting at least one SSB having a received signal strength equal to or greater than a predetermined threshold as a result of the searching, transmitting, to the BS and through the first TRP, a first SSB search result report message including information on the at least one SSB having the received signal strength equal to or greater than the predetermined threshold.

10 Claims, 30 Drawing Sheets

100

SYCHRONIZATION METHOD AND APPARATUS FOR WIRELESS TRANSMISSION BETWEEN TERMINAL AND MULTIPLE TRANSMISSION AND RECEPTION POINTS IN WIRELESS COMMUNICATION SYSTEM

CROSS-REFERENCE TO RELATED APPLICATIONS

This application claims priority to Korean Patent Applications No. 10-2022-0138415, filed on Oct. 25, 2022, and No. 10-2023-0141391, filed on Oct. 20, 2023, with the Korean Intellectual Property Office (KIPO), the entire contents of which are hereby incorporated by reference.

BACKGROUND

1. Technical Field

Exemplary embodiments of the present disclosure relate to a synchronization technique in a wireless communication system, and more specifically, to a technique for synchronization between a terminal and transmission and reception points (TRPs) in a wireless communication system.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g. Long Term Evolution (LTE) communication system or LTE-Advanced (LTE-A) communication system), the 5th generation (5G) communication system (e.g. new radio (NR) communication system) that uses a frequency band (e.g. a frequency band of 6 GHz or above) higher than that of the 4G communication system as well as a frequency band of the 4G communication system (e.g. a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Meanwhile, when multiple base stations (BSs) or transmission and reception points (TRPs) cooperate to transmit data to a user equipment (UE), the signal-to-noise ratio (SNR) at the UE increases, enhancing the probability of data restoration at the UE. The cooperative communication scheme is more effective when wireless communication is conducted using an ultra-high frequency band, such as a millimeter-wave frequency band or terahertz frequency band. In an ultra-high frequency band, signals are characterized by strong linearity and significant power attenuation over distance. Consequently, in a wireless communication system utilizing the ultra-high frequency band, the coverage that one BS or TRP can provide is limited and vulnerable to obstacles.

To address these challenges, it is imperative to adopt a cooperative communication approach in ultra-high frequency band communication, involving the installation of numerous BSs or TRPs to overcome small service coverages and mitigate signal blockage caused by obstacles. In the above-described manner, multiple BSs or TRPs cooperate to transmit data to a single terminal.

Therefore, a synchronization method for wireless transmission between a terminal and multiple TRPs or a terminal and a plurality of base stations is needed.

SUMMARY

Exemplary embodiments of the present disclosure are directed to providing a method for synchronization between a terminal and multiple TRPs or between a terminal and a plurality of base stations.

According to a first exemplary embodiment of the present disclosure, a method of a user equipment (UE) may comprise: receiving a first synchronization signal block (SSB) search request message including SSB search options through a first transmission and reception point (TRP) connected to a base station (BS); searching for a plurality of SSBs based on the SSB search options; in response to presence of a beam transmitting at least one SSB having a received signal strength equal to or greater than a predetermined threshold as a result of the searching, transmitting a first SSB search result report message to the BS through the first TRP, the first SSB search result report message including information on the at least one SSB having the received signal strength equal to or greater than the predetermined threshold; receiving a first physical downlink control channel (PDCCH) order including an SSB index and a preamble index from the first TRP; and performing a random access procedure with a second TRP transmitting a beam corresponding to the SSB index included in the first PDCCH order.

The SSB search options may include at least one of a field indicating an SSB search exclusion list, a field indicating inter-cell SSB search, a field indicating a maximum number of SSBs reported by the UE, or a reporting option field indicating whether to report on the searching based on the SSB search options.

The reporting option field may include at least one of a subfield indicating a reporting order of SSB indexes reported by the UE to the BS, a subfield indicating whether to include a metric to be used when reporting the SSB indexes, a subfield indicating whether to report a physical cell identity together with the SSB indexes, a subfield indicating whether to report a result of executing the first PDCCH order, a subfield indicating whether to report a timing advance (TA) value for a beam additionally connected with the UE based on the first PDCCH order, or a subfield indicating whether to include a metric for the beam additionally connected with the UE based on the first PDCCH order.

The method may further comprise: in response to identifying no SSB having a received signal strength equal to or greater than the predetermined threshold as a result of the searching, transmitting SSB index search failure information by including the SSB index search failure information in the SSB search result report message; receiving a second SSB search request message including changed SSB search options from the first TRP; searching for a plurality of SSBs based on the changed SSB search options included in the second SSB search request message; in response to presence of a beam transmitting at least one SSB having a received signal strength equal to or greater than the predetermined threshold as a result of the searching based on the changed SSB search options, transmitting a second SSB search result report message including information on the at least one SSB having the received signal strength equal to or greater than the predetermined threshold to the BS through the first TRP; receiving a second PDCCH order including an SSB index and a preamble index from the first TRP; and performing a random access procedure with a second TRP transmitting a beam corresponding to the SSB index included in the second PDCCH order.

The random access procedure with the second TRP may comprise: transmitting a preamble corresponding to the preamble index included in the second PDCCH order to the second TRP; and receiving a response signal including a timing advance (TA) value from the second TRP.

The method may further comprise: when a reporting option field of the SSB search options is set to allow the UE to report a TA value for a beam additionally connected based on the first PDCCH order after executing the first PDCCH order, transmitting a TA value obtained from the second TRP to the first TRP by including the TA value in a report message of a result after executing the first PDCCH order.

When a physical cell identity (PCI) of the second TRP is different from a PCI of the first TRP, the first PDCCH order may further include the PCI of the second TRP.

According to a second exemplary embodiment of the present disclosure, a method of a base station may comprise: in response to determining that an addition beam is required to be allocated to a user equipment (UE) connected through a first transmission and reception point (TRP), transmitting a first synchronization signal block (SSB) search request message to the UE through the first TRP; receiving a first SSB search result report message from the UE; in response to the first SSB search result report message including information on two SSBs, selecting an SSB other than an SSB transmitted by the first TRP among the SSBs; and transmitting a first physical downlink control channel (PDCCH) order including an index of the selected SSB and a reserved preamble index to the UE through the first TRP.

The SSB search options may include at least one of a field indicating an SSB search exclusion list, a field indicating inter-cell SSB search, a field indicating a maximum number of SSBs reported by the UE, or a reporting option field indicating whether to report on the searching based on the SSB search options, and the reporting option field may include at least one of a subfield indicating a reporting order of SSB indexes reported by the UE to the BS, a subfield indicating whether to include a metric to be used when reporting the SSB indexes, a subfield indicating whether to report a physical cell identity together with the SSB indexes, a subfield indicating whether to report a result of executing the first PDCCH order, a subfield indicating whether to report a timing advance (TA) value for a beam additionally connected with the UE based on the first PDCCH order, or a subfield indicating whether to include a metric for the beam additionally connected with the UE based on the first PDCCH order.

The method may further comprise: when the reporting option field of the SSB search options is set to allow the UE to report a TA value for a beam additionally connected with the UE based on the first PDCCH order after executing the first PDCCH order, receiving a report message of a result after executing the first PDCCH order from the UE through the first TRP, wherein the report message of the result after executing the first PDCCH order includes a TA value obtained by the UE from the second TRP.

The method may further comprise: in response to that the first SSB search result report message includes information on two or more SSBs, and two or more SSBs are selected among the two or more SSBs in the first SSB search result report message, selecting a first SSB to be included in the first PDCCH order; and after receiving the report message of the result after executing the first PDCCH order, transmitting, to the UE and through the first TRP, an SSB selection message including a second SSB index and a TA value identical to the TA value included in the report message of the result after executing the first PDCCH order.

The method may further comprise: when the first SSB search result report message includes SSB index search failure information, transmitting a second SSB search request message including changed SSB search options to the UE through the first TRP; receiving a second SSB search result report message from the UE; when the second SSB search result report message includes information on two or more SSBs, selecting an SSB other than an SSB transmitted by the first TRP among the two or more SSBs indicated by the second SSB search result report message; and transmitting a second PDCCH order including an index of the selected SSB and a reserved preamble index to the UE through the first TRP.

When a physical cell identity (PCI) of the second TRP is different from a PCI of the first TRP, the first PDCCH order may further include the PCI of the second TRP.

The method may further comprise: when the first SSB search result report message includes information on only SSB(s) transmitted by the first TRP or includes SSB index search failure information for all TRPs connected to the base station, checking whether additional connection with a TRP of a neighbor base station is possible; when additional connection with a TRP of a neighbor base station is possible, requesting information on a third TRP of the neighbor base station; receiving information on the third TRP and information on a reserved preamble index from the neighbor base station; transmitting a third SSB search request message including changed search options for searching for the third TRP to the UE through the first TRP; receiving a third SSB search result report message from the UE; selecting one of SSBs indicated by the third SSB search result report message; and transmitting a third PDCCH order including an index of the selected SSB and the reserved preamble index to the UE through the first TRP.

The method may further comprise: when a reporting option field of the SSB search options is set to allow the UE to report a TA value for a beam additionally connected based on the third PDCCH order after executing the third PDCCH order, receiving a report message of a result after executing the first PDCCH order from the UE through the first TRP, wherein the report message of a result after executing the first PDCCH order includes a TA value obtained by the UE from the second TRP.

According to a third exemplary embodiment of the present disclosure, a method of a user equipment (UE) may comprise: receiving a message including information on timing advance group(s) (TAG(s)) through a first transmission and reception point (TRP) connected to a base station (BS); receiving a physical downlink control channel (PDCCH) order including a preamble index for accessing a second TRP from the first TRP; and performing a random access procedure with the second TRP based on the PDCCH order.

The method may further comprise: receiving a first synchronization signal block (SSB) search request message including SSB search options for searching for SSBs of the second TRP before receiving the PDCCH order; searching for a plurality of SSBs based on the SSB search options; and in response to presence of a beam transmitting at least one SSB having a received signal strength equal to or greater than a predetermined threshold as a result of the searching, transmitting a first SSB search result report message to the BS through the first TRP, the first SSB search result report message including information on the at least one SSB having the received signal strength equal to or greater than the predetermined threshold.

The SSB search options may further include a TAG identifier based on the information on the TAG(s).

The PDCCH order may include one of indexes of SSBs included in the first SSB search result report message.

The PDCCH order may further include a TAG identifier based on the information on the TAG(s).

According to the present disclosure, the UE can acquire frequency and time synchronization and obtain a timing advance (TA) value for a determined beam. This approach helps to reduce resource waste and performance degradation that may occur in the process of selecting multiple TRPs and applying TAs. Additionally, the present disclosure facilitates a reduction in the time delay of the system and an improvement in SNR performance.

DETAILED DESCRIPTION OF THE EMBODIMENTS

Figure 1:
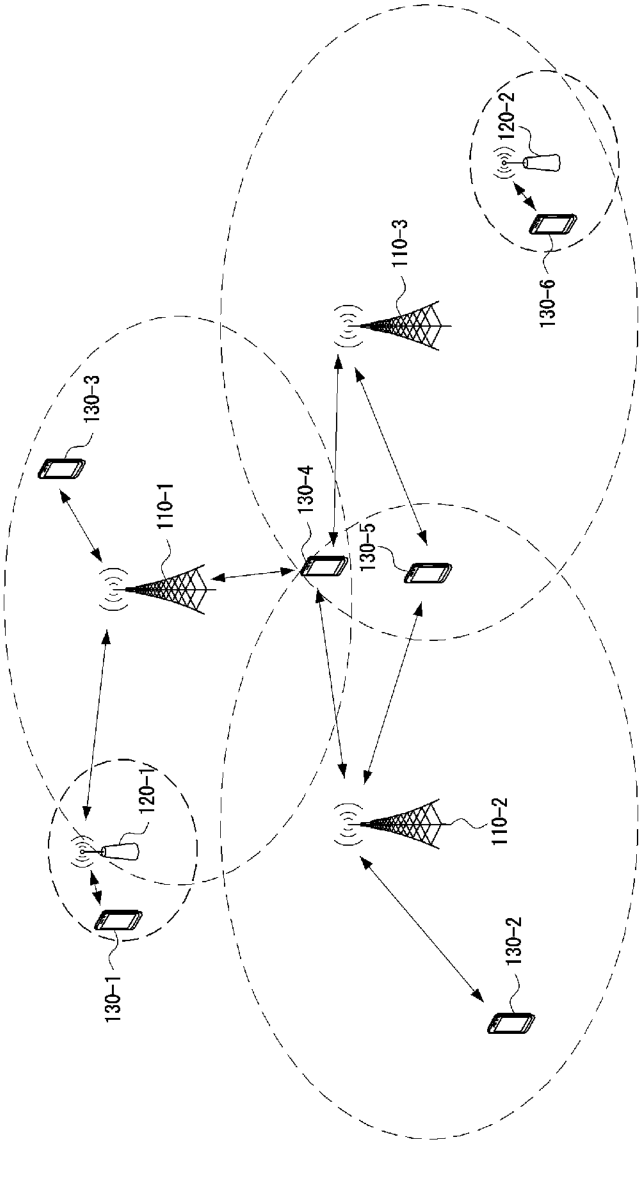
FIG. 1 is a conceptual diagram illustrating an exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g. long term evolution (LTE), LTE-advanced (LTE-A)), 5th generation (5G) communication (e.g. new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3,

130-4, 130-5, and 130-6 constituting the communication system 100 may have the following structure.

Figure 2:
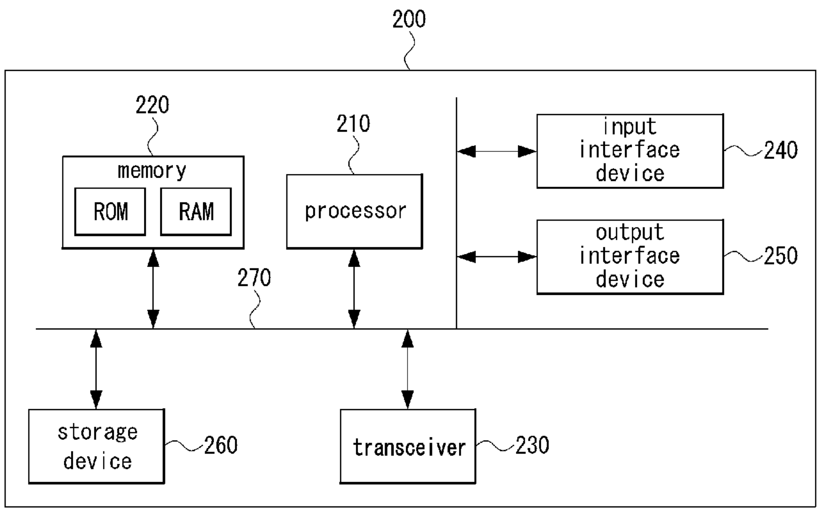
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g. a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

Figure 3A:
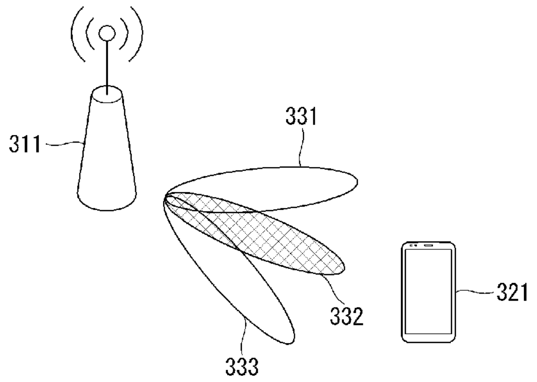
FIG. 3A is a conceptual diagram illustrating a case where one TRP is connected to one UE using one downlink beam.

FIG. 3A is a conceptual diagram illustrating a case where one TRP is connected to one UE using one downlink beam.

Referring to FIG. 3A, a case in which one transmission and reception point (TRP) 311 can use three different downlink beams 331, 332, and 333 is illustrated. In FIG. 3A, only three downlink beams 331, 332, and 332 are illustrated for convenience of description, but the TRP 331 may use four or more downlink beams or only two downlink beams.

A user Equipment (UE) 321 may transmit and receive signals (or data) with the TRP 311 through a radio channel. The radio channel between UE 321 and TRP 311 may be divided into a downlink channel and an uplink channel. The downlink channel from TRP 311 to UE 321 may be formed using downlink beam(s). The uplink channel from UE 321 to TRP 311 may be formed using uplink beam(s) (not shown in the drawing).

FIG. 3A illustrates a case where the downlink channel with UE 321 is established through the second downlink beam 332 among the plurality of downlink beams 331, 332, and 333 that the TRP 311 can form. In FIG. 3A, among the plurality of downlink beams 331, 332, and 333 that the TRP 311 can form, the second downlink beam 332, which forms the downlink channel with UE 321, is illustrated as being distinguished from other beams through hatching. In other words, FIG. 3A illustrates a case where a downlink channel is established using one downlink beam between TRP 311 and UE 321.

Meanwhile, the TRP 311 and UE 321 illustrated in FIG. 3A may have the same components as previously described in FIG. 2, may include at least some of the components, or may have additional components. For example, the TRP 311 may have a component for connecting to an upper node in addition to the components illustrated in FIG. 2. Additionally, the UE 321 may further include various input devices and output devices for interfacing with a user in addition to the components illustrated in FIG. 2, and may further include at least one sensor.

Figure 3B:
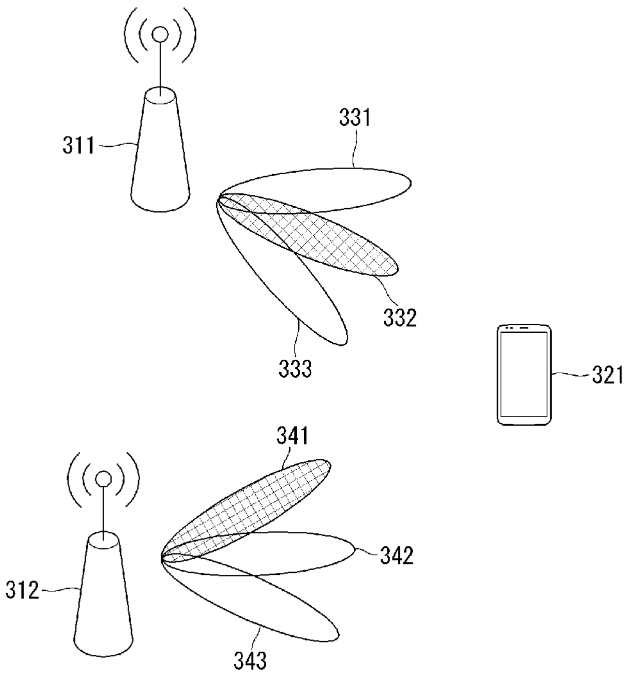
FIG. 3B is a conceptual diagram illustrating a case where each of two different TRPs is connected to one UE using one downlink beam.

FIG. 3B is a conceptual diagram illustrating a case where each of two different TRPs is connected to one UE using one downlink beam.

Referring to FIG. 3B, two different TRPs 311 and 312 are illustrated. In order to identify two different TRPs, they will be described separately as the first TRP 311 and a second TRP 312. The first TRP 311 is illustrated assuming that it can use the three different downlink beams 331, 332, and 333, as illustrated in FIG. 3A. The second TRP 312 is also illustrated assuming that it can use three different downlink beams 341, 342, and 343. It should be noted that the illustration of three downlink beams for each of the TRPs 311 and 312 in FIG. 3B is merely for convenience of description, without being limited thereto.

The UE 321 may transmit and receive signals (or data) through a radio channel with the first TRP 311, and the UE 321 may also transmit signals (or data) through a radio channel with the second TRP 312.

The radio channels between the UE 321 and the TRPS 311 and 312 may each be divided into a downlink channel and an uplink channel. The downlink channel from TRP 311 to UE 321 may be formed using downlink beam(s). The uplink channels may be formed using uplink beam(s) (not shown in the drawing) from UE 321 to first TRP 311 and/or uplink beam(s) (not shown in the drawing) from UE 321 to second TRP 312.

In FIG. 3B, a downlink channel is formed with the UE 321 through the second downlink beam 332 among the plurality of downlink beams 331, 332, and 333 that the first TRP 311 can form, and another downlink channel is formed with the UE 321 through the first downlink beam 341 among the plurality of downlink beams 341, 342, and 343 that the TRP 312 can form.

In FIG. 3B, the second downlink beam 332 forming the downlink channel with the UE 321 among the plurality of downlink beams 331, 332, and 333 that the first TRP 311 can form and the first downlink beam 341 forming the downlink channel with the UE 321 among the plurality of downlink beams 341, 342, and 343 that the second TRP 312 can form are illustrated as being distinguished from other beams through hatching. In other words, FIG. 3B illustrates a case where a downlink channel is formed using the one downlink beam 332 between first TRP 311 and UE 321, and a downlink channel is formed using the one downlink beam 341 between second TRP 312 and UE 321.

Each of the TRP 311, TRP 312, and UE 321 illustrated in FIG. 3B may have the same components as previously described in FIG. 2, may include at least some of the components, or may have additional components. For example, each of the TRP 311 and TRP 312 may have a component for connecting to an upper node in addition to the components illustrated in FIG. 2. Additionally, the UE 321 may further include various input devices and output devices for interfacing with a user in addition to the components illustrated in FIG. 2, and may further include at least one sensor.

Figure 3C:
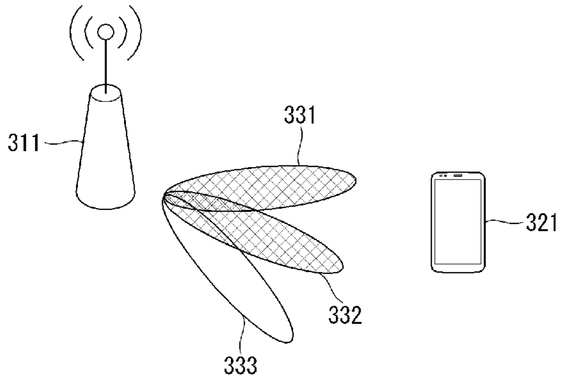
FIG. 3C is a conceptual diagram illustrating a case where one TRP is connected to one UE using two different downlink beams.

FIG. 3C is a conceptual diagram illustrating a case where one TRP is connected to one UE using two different downlink beams.

FIG. 3C illustrates a case similar to that of FIG. 3A described above. Therefore, only a part of FIG. 3C that is different from FIG. 3A will be described. FIG. 3C illustrates a case where the TRP 311 forms a radio channel with the UE 321 by simultaneously using the first beam 331 and the second beam 332 among three different downlink beams 331, 332, and 333. In FIG. 3C, among the plurality of downlink beams 331, 332, and 333 that the TRP 311 can form, the first downlink beam 331 and the second downlink beam 332 forming the downlink channel with the UE 321 are illustrated as being distinguished from other beams through hatching. In other words, this may correspond to a case where one TRP 311 allocates two or more beams 331 and 332 to one UE 321 as downlink beams.

Each of the TRP 311 and UE 321 illustrated in FIG. 3C may have the same components as previously described in FIG. 2, may include at least some of the components, or may have additional components. For example, the TRP 311 may have a component for connecting to an upper node in addition to the components illustrated in FIG. 2. Additionally, the UE 321 may further include various input devices and output devices for interfacing with a user in addition to the components illustrated in FIG. 2, and may further include at least one sensor.

Figure 3D:
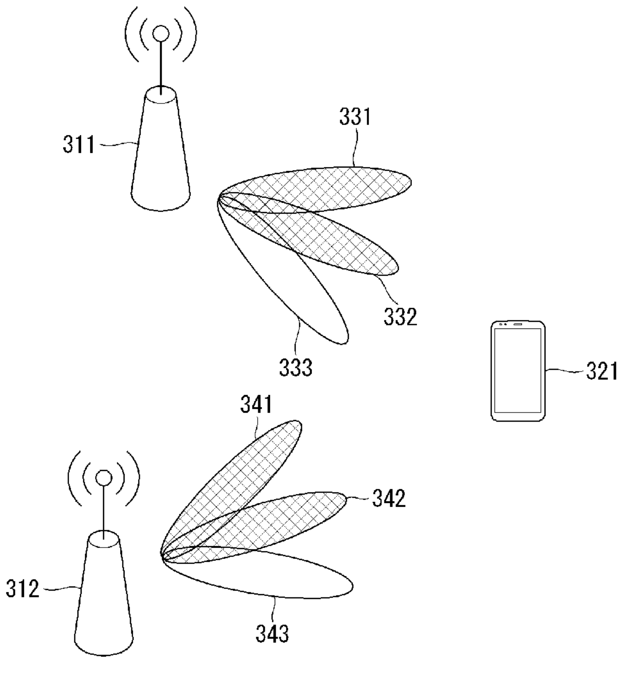
FIG. 3D is a conceptual diagram illustrating a case where two different TRPs are connected to one UE by respectively using two different downlink beams.

FIG. 3D is a conceptual diagram illustrating a case where two different TRPs are connected to one UE by respectively using two different downlink beams.

FIG. 3D illustrates a case where both the previously described cases of FIG. 3B and FIG. 3C are applied. In other words, the first TRP 311 allocates the first downlink beam 331 and the second downlink beam 332 among the three beams 331, 332, and 333 to the UE 321, and the second TRP 312 allocates the first downlink beam 341 and the second downlink beam 342 among the three beams 341, 342, and 343 to the UE 321. In FIG. 3D, among the plurality of downlink beams 331, 332, and 333 that the first TRP 311 can form, the first downlink beam 331 and the second downlink beam 332 forming a downlink channel with the UE 321 are illustrated as being distinguished from other beams through hatching, and among the plurality of downlink beams 341, 342, and 343 that the second TRP 312 can form, the first downlink beam 341 and the second downlink beam 342 forming a downlink channel with the UE 321 are illustrated as being distinguished from other beams through hatching. Therefore, the UE 321 may form a downlink channel using two different downlink beams 331 and 332 from the first TRP 311 and may form another downlink channel using two different downlink beams 341 and 342 from the second TRP 312.

Each of the TRP 311, TRP 312, and UE 321 illustrated in FIG. 3D may have the same components as previously described in FIG. 2, may include at least some of the components, or may have additional components. For example, each of the TRP 311 and TRP 312 may have a component for connecting an upper node in addition to the components illustrated in FIG. 2. Additionally, the UE 321 may further include various input devices and output devices for interfacing with a user in addition to the components illustrated in FIG. 2, and may further include at least one sensor.

Meanwhile, in the examples of FIGS. 3A to 3D, the number of downlink beams that can be formed by each TRP may be the same or different for each TRP. In addition, in FIGS. 3A to 3D, downlink beams between one TRP and the UE or between two TRPs and the UE have been described. However, even when the number of TRPs is three or more, the same scheme may be applied based on the schemes described in FIGS. 3A to 3D. In addition, FIG. 3D illustrates the case where both the first TRP 311 and the second TRP 312 each use two beams as downlink beams. However, when one UE receives downlink beams from multiple TRPs, it may use only one downlink beam from specific TRP(s) while utilizing two or more downlink beams from other TRP(s).

Further, in the cases of FIGS. 3B and 3D, it may be assumed that cooperative transmission is performed when the two TRPs respectively form downlink beams to the UE. Here, the cooperative transmission may mean that different TRPs 312 and 312 cooperate to transmit data for one service provided to the UE 321. During the cooperative transmission, the data for one service may be transmitted simultaneously or sequentially from the TRPs.

Figure 4A:
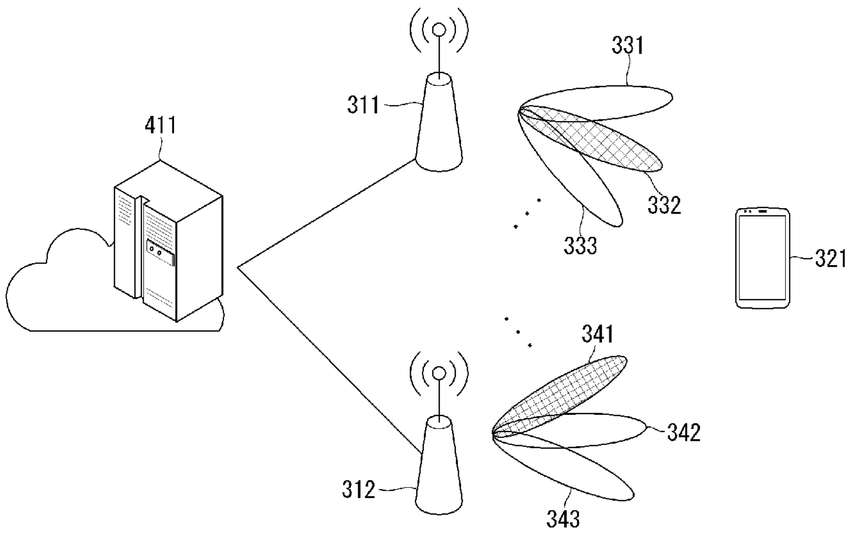
FIG. 4A is a conceptual diagram illustrating a case where multiple TRPs are connected to a UE in an intra-cell multi-TRP environment.

FIG. 4A is a conceptual diagram illustrating a case where multiple TRPs are connected to a UE in an intra-cell multi-TRP environment.

Before referring to FIG. 4A, it should be noted that the same parts as those described in FIG. 3B have the same reference numerals. For example, the first TRP 311, second TRP 312, and UE 321 may be the same components as described in FIG. 3B. Describing the parts of FIG. 4A that are different from those of FIG. 3B, the first TRP 311 uses a plurality of beams (i.e. 331, 332, 333, . . . , and the like) and the second TRP 312 uses a plurality of beams (i.e. 341, 342, 343, . . . , and the like). In FIG. 4A, the first TRP 311 may transmit signals (or data) to the UE 321 through the second downlink beam 332, and the second TRP 312 may transmit signals (or data) to the UE 321 through the first downlink beam 341. The beams 332 and 341 selected as downlink beams are distinguished from other beams through hatching in the same manner as in FIG. 3B.

Referring to FIG. 4A, the first TRP 311 and the second TRP 312 are connected to the same base station (BS) 411. Generally, the one BS 411 is an entity that manages radio resources of one cell. Therefore, the BS 411 may control the first TRP 311 and the second TRP 312 connected below the BS 411. In other words, the BS 411 may perform control to transmit downlink data or receive uplink data between the UE 321 and the TRPs 311 and 312 connected below the BS 411. The environment in which the UE 321 communicates through the first TRP 311 and the second TRP 312 connected below the one BS 411 as described above may be referred to as 'intra-cell multi-TRP (m-TRP) environment'.

Therefore, when the UE 321 actually transmits/receives downlink and/or uplink signals (or data) through the first TRP 311 and the second TRP 312, allocation and control of resources may be performed under control of the BS 411.

Meanwhile, the BS 411 illustrated in FIG. 4A may have the same components as previously described in FIG. 2, may include at least some of the components, or may have additional components. For example, the BS 411 may further have a component for connecting to a multi-TRP, a component for connecting to another BS (not shown in FIG. 4A), and a component for connecting to an upper node, in addition to the components described in FIG. 2.

Figure 4B:
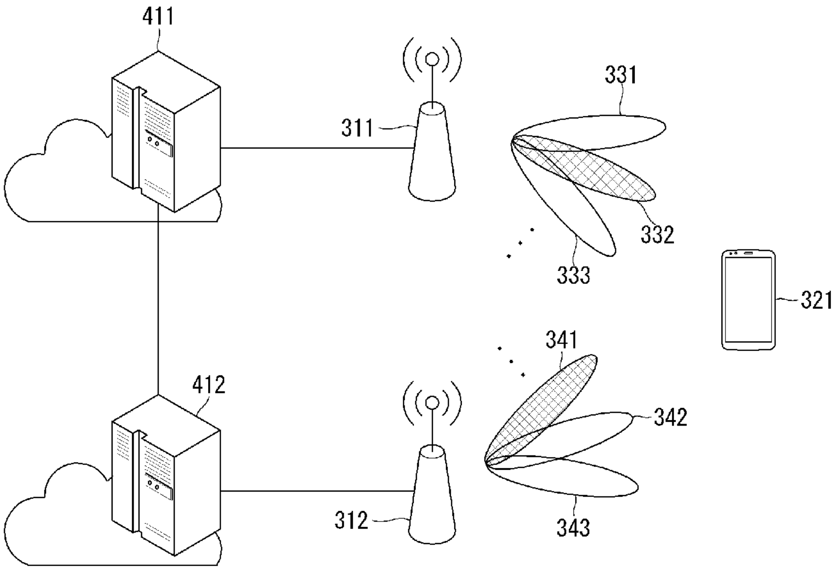
FIG. 4B is a conceptual diagram illustrating a case where multiple TRPs are connected to a UE in an inter-cell multi-TRP environment.

FIG. 4B is a conceptual diagram illustrating a case where multiple TRPs are connected to a UE in an inter-cell multi-TRP environment.

It should also be noted that the same reference numerals are used in FIG. 4B for parts that are the same as those previously described in FIG. 3B. As described in FIG. 4A, the parts of FIG. 4B that are different from those of FIG. 3B are the same, so further description will be omitted.

Referring to FIG. 4B, the first TRP 311 is connected to the first BS 411, and the second TRP 312 is connected to a second BS 412. Additionally, the BSs 411 and 412 may be connected to each other through, for example, an Xn interface. As described above, in general, each of the BSs 411 and 412 may be an entity for managing radio resources of one cell. Therefore, the first BS 411 may control the first TRP 311 connected to the first BS 411, and the second BS 412 may control the second TRP 312 connected to the second BS 412. In other words, the first BS 411 may perform control to transmit downlink data or receive uplink data between the UE 321 and the first TRP 311 connected below the first BS 411, and the second BS 412 may perform control to transmit downlink data or receive uplink data between the UE 321 and the second TRP 312 connected below the second BS 412. The environment in which downlink and uplink communication is performed between the UE 321 and the TRPs 311 and 312 belonging to different BSs 411 and 412 may be referred to as 'inter-cell multi-TRP environment'.

Figure 5:
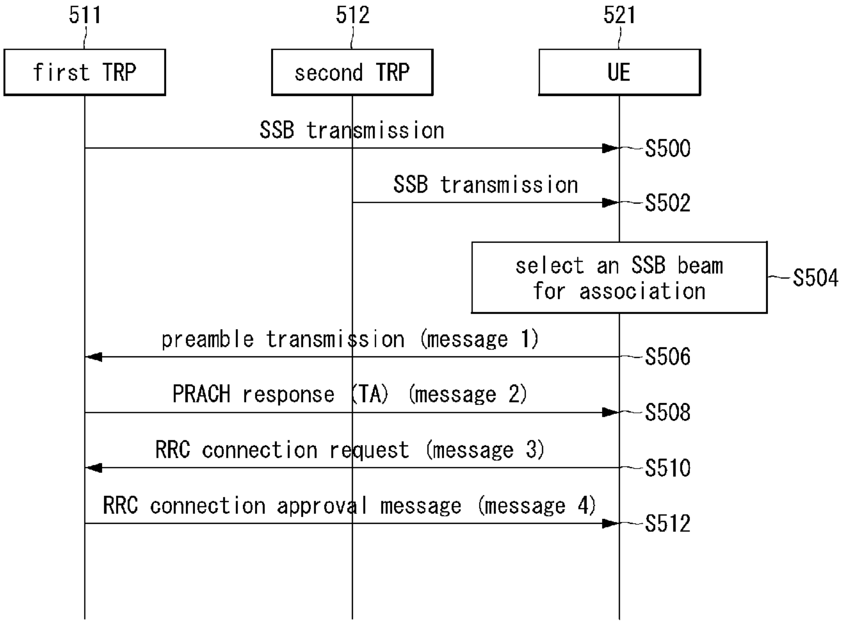
FIG. 5 is a sequence chart illustrating an initial access procedure of a UE in a multi-TRP environment.

FIG. 5 is a sequence chart illustrating an initial access procedure of a UE in a multi-TRP environment.

Before describing with reference to FIG. 5, it should be noted that TRPs 511 and 512 and a UE 521 each include all or at least part of the components of FIG. 2 described above.

Referring to FIG. 5, in steps S500 and S502, each of the first TRP 511 and second TRP 512 may broadcast synchronization signal blocks (SSBs) at a preset periodicity. In this case, times at which the first TRP 511 and second TRP 512 each transmit SSBs may be the same time or different times. For convenience of description, FIG. 5 illustrates a case where the first TRP 511 first broadcasts SSBs in the step S500, and then the second TRP 512 broadcasts SSBs in the step S502. However, the step S502 may be performed first, followed by the step S500, or the steps S500 and S502 may be performed simultaneously.

Additionally, as described above, each of the first TRP 511 and second TRP 512 may use a plurality of beams. Accordingly, each of the first TRP 511 and second TRP 512 may transmit SSBs through all beams that can be formed. In other words, the first TRP 511 may broadcast SSBs through all beams that the first TRP 511 can form at every preset periodicity, and the second TRP 512 may broadcast SSBs through all beams that the second TRP 512 can form at every preset periodicity.

Meanwhile, the UE 521 should first access a base station to receive services. The UE 521 may perform a cell search process to access the base station. When performing cell search, the UE 521 may receive SSB(s) from the first TRP 511 and second TRP 512 in the steps S500 and S502. The UE 521 may receive SSB(s) from each of the first TRP 511 and second TRP 512 in the steps S500 and S502, and may acquire time and frequency synchronization with the first TRP 511 and second TRP 512. In addition, the UE 521 may obtain a cell identity (cell ID) through the SSB received from each of the first TRP 511 and second TRP 512 in the steps S500 and S502.

As illustrated in FIG. 5, since the UE 521 receives SSBs from the first TRP 511 and the second TRP 512, the UE 521 may need to select one TRP. In a step S504, the UE 521 may select one TRP based on signal strengths of the SSBs received from the first TRP 511 and second TRP 512. In this case, selecting one TRP may have the same meaning as selecting a beam of the corresponding TRP. Additionally, as previously described in FIGS. 4A and 4B, an operation of selecting a beam corresponding to one TRP by the UE 321 may be an operation of selecting a BS corresponding to the TRP.

When selecting one TRP (or beam) based on the signal strengths of the received SSBs, the UE 521 may select one TRP (or beam) having an SSB having a signal strength greater than a preset threshold. The TRP selected as described above may be a TRP for the UE to perform an association procedure or for the UE to perform transmission of a random access preamble signal.

Although not illustrated in the procedure of FIG. 5, the UE 521 may detect a master information block (MIB) from a physical broadcast channel (PBCH) of the SSB after synchronization, and identify a CORESET 0 and search space based on a parameter PDCCH-ConfigSIB1 of the MIB. The CORESET 0 and search space are used for physical downlink control channel (PDCCH)/downlink control information (DCI) monitoring. Then, the UE 521 may identify where a system information block 1 (SIB1) is located in a physical downlink shared channel (PDSCH) by decoding a DCI 1_0 in the search-space. Then, the UE 521 may decode the PDSCH including the SIB1 and other SIBs. Through the procedure described above, the UE 521 may obtain information on a random access period and information on available preambles for performing a PRACH process from the SSB.

In a step S506, the UE 521 may select one of the available preambles, and transmit the selected preamble to the base station in the random access period, thereby starting an association procedure. In this case, the UE 521 may not know information such as how many TRPs exist in a cell managed by the base station or which TRP it is connected to, and may only know a beam number (index) of the selected beam.

Describing the association procedure, in the step S504, the UE 521 may select an SSB beam for association among the SSBs respectively received from the first TRP 511 and second TRP 51. Then, in the step S506, the UE 521 may transmit the preamble in the random access period during which communication through the corresponding beam is possible. Here, the UE 521 may use various methods to select the beam, such as selecting a beam having the greatest received signal strength, selecting a first beam among beams having a received signal strength exceeding the threshold, or selecting a beam having the greatest received signal strength among beams having a received signal strength exceeding the threshold.

It should be noted that the example in FIG. 5 assumes that the beam selected by the UE 521 in the step S504 is a beam transmitted by the first TRP 511. If a beam transmitted by the second TRP 512 is selected, a procedure described below may be performed with the second TRP 512.

The first TRP 511 receiving the preamble from the UE 521 may transmit a response message (i.e. random access response, RAR) including a timing advance (TA) value through the selected beam in a step S508, in response to receipt of the preamble. The PRACH response message including the TA value may be referred to as 'message 2 (Msg2)'. The message 2 may include the TA value and uplink resource information of a physical uplink shared channel (PUSCH).

In a step S510, the UE 521 may transmit a radio resource control (RRC) connection request message to the first TRP 511 in response to the message 2. In a step S512, the first TRP 511 may transmit an RRC connection approval message. Through the above procedure, the association procedure of the UE 521 with the first TRP 511 may be completed.

When the 4-step random access procedure illustrated in FIG. 5 is completed, the UE 521 may transition to a connected state and may receive services from the base station. In this case, the UE 521 may not know whether it is connected to the first TRP 511 or the second TRP 512. The UE 521 only recognizes that it belongs to a serving cell managed by the BS, and may be in a state of capable of receiving downlink and uplink data services through the first TRP 511.

Meanwhile, FIG. 5 has been described using the random access procedure, which is the 4-step initial access procedure. However, even in case of using a 2-step initial access procedure, the same may be applied if only the RACH part is replaced with 2 steps.

A relatively large number of techniques have been disclosed regarding a method for a UE, which is a receiving node, to combine signals received from multiple TRPs, in the scheme in which multiple TRPs transmit data to one UE based on the method described above.

However, there is still insufficient research on how the UE performs initial access to multiple TRPs and procedures for transmitting and receiving data with multiple TRPs through downlink and uplink. Therefore, the present disclosure will describe techniques that can increase accuracy while reducing waste of radio resources when connecting between a UE and multiple TRPs in the multi-TRP environment.

In the present disclosure described below, a device that manages radio devices (e.g. TRP and/or UE) will be referred to as a base station (BS). As previously described, the BS may be an entity that manages a cell, and one cell may have one physical cell identity (PCI). Accordingly, each cell has a different PCI in order to distinguish itself from other surrounding cells and/or cells managed by another BS. The PCI may be referred to as 'cell ID'. In the present disclosure, the TRP may be a radio device that provides data services to the terminal by being connected to the BS. One BS may be connected to one or multiple TRPs. For convenience of description, hereinafter, the description will be made assuming that multiple TRPs are connected to one BS. It may be assumed that the BS can know statuses of TRPs under its management (e.g. information on connected UEs, etc.) in real time. The connection between the BS and TRP may be wired or wireless. In the present disclosure, there is no special limitation on the type of connection (wired or wireless) between the BS and TRP, and such connection will not be discussed.

In addition, the present disclosure described below does not cover the procedure in which the UE initially selects an optimal (best) SSB and performs an association with the BS through a TRP connected to the SSB. The present disclosure will describe procedures performed in a state in which the UE is currently receiving services in the connected state with the BS through a specific TRP after the UE associates with the BS.

More specifically, a procedure for performing access through efficient resource allocation when the UE wishes to receive a service using a TRP other than the TRP to which it is currently connected or using multiple beams within the same TRP will be described. In addition, the present disclosure will describe not only a case where the additional TRP is within the same cell but also a case where it belongs to another cell.

Figure 6:
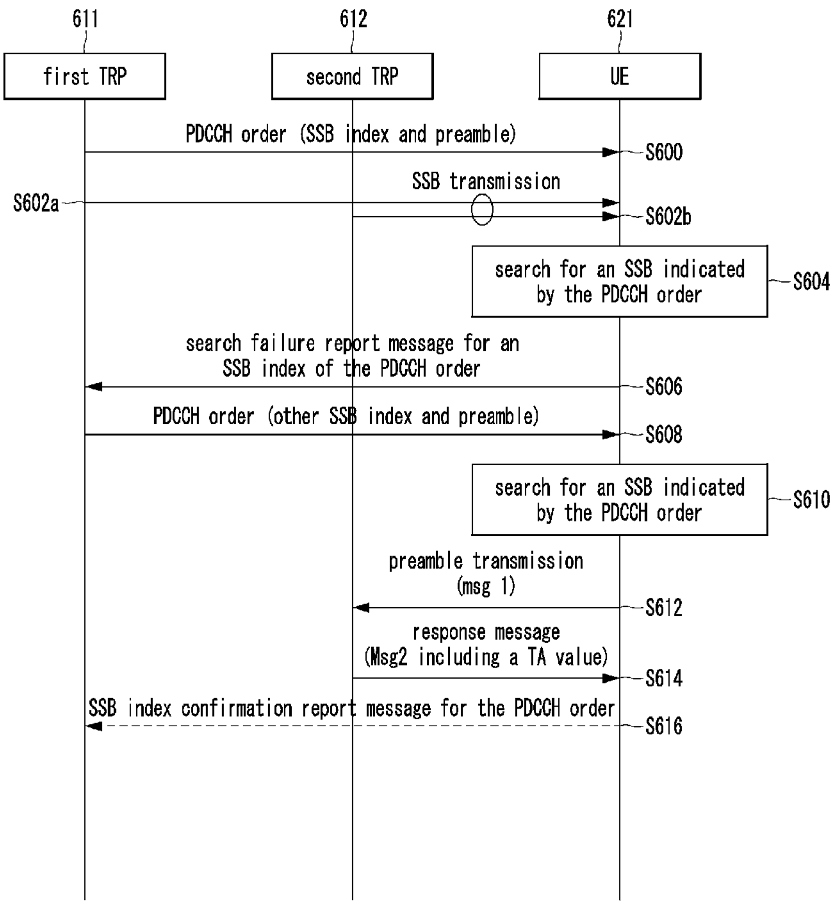
FIG. 6 is a sequence chart illustrating a procedure for accessing an additional TRP for a UE that is connected to one TRP in a multi-TRP environment.

FIG. 6 is a sequence chart illustrating a procedure for accessing an additional TRP for a UE that is connected to one TRP in a multi-TRP environment.

Before describing with reference to FIG. 6, it should be noted that TRPs 611 and 612 and a UE 621 may have the same or similar components as those in FIG. 2, except that the reference numerals are different.

In FIG. 6, it is assumed that the UE 621 is in a connected state with the first TRP 611. In other words, the UE 621 has performed an association with a BS by performing an initial access procedure through the first TRP 611. Accordingly, the UE 621 may obtain information of the first TRP 611, such as information on a cell ID and a beam index, through an SSB transmitted by the first TRP 611. Here, the beam index may have the same meaning as an SSB index. Since an SSB is transmitted for each beam, the beam index may refer to an index of an SSB for identifying the beam through which the SSB is transmitted. Therefore, in the following description, the term 'SSB index' will be used for convenience of description.

The procedure illustrated in FIG. 6 may be performed when the BS wishes to perform multi-TRP transmission or multi-beam transmission for various purposes such as improving SNR gain, improving transmission rate, and/or improving transmission data reliability in communication with the UE.

The first TRP 611 described in FIG. 6 may mean a TRP in a connected state with the UE 621. Additionally, the second TRP 612 described in FIG. 6 may mean a TRP to be added to the UE 621. If a third additional TRP is added while the first TRP 611 and the second TRP 612 have been added, the third additional TRP may become a third TRP (not shown). The number of added TRPs may be determined based on the number of beams that the UE 621 can receive and/or capability of the UE 621. If it is possible to communicate with four or more TRPs, the N-th added TRP may be referred to as 'N-th TRP'.

Referring to FIG. 6, in a step S600, the first TRP 611 may transmit a PDCCH order message to the UE 621. Here, the PDCCH order may be a type of downlink control information (DCI) and may be a command for the BS to indicate the UE 621 to perform random access. The PDCCH order according to the present disclosure may include an SSB index and a reserved preamble index as parameters. In this case, when the BS wants to add a new TRP, the BS may select one of SSBs belonging to the second TRP 612 as the SSB index of the PDCCH order. Additionally, when adding a new TRP, the BS may prevent a preamble collision from occurring by selecting the preamble reserved in advance in the PDCCH order. Therefore, in the step S600, the first TRP 611 may configure the parameters of the PDCCH order to include one of the SSBs belonging to the second TRP 612 and the pre-reserved preamble index based on the control of the BS, and may transmit the PDCCH order to the UE 621.

Accordingly, in the step S600, the UE 621 may receive the PDCCH order including the SSB index and the reserved preamble index.

In a step S602*a*, the first TRP 611 may transmit SSB(s) of the first TRP 611 in an SSB transmission period, and in a step S602*b*, the second TRP 612 may transmit SSB(s) of the second TRP 612 in the SSB transmission period. Accordingly, in a step S604, the UE 621 may search for an SSB corresponding to the SSB index in the SSB transmission period by using the SSB index and preamble index included in the PDCCH order.

In FIG. 6, the example of the step S604 being performed after the steps S602*a* and S602*b* is illustrated to described the procedure. In the step S604, the UE 621 may use the SSB index included in the PDCCH order to search for SSBs of the first TRP 611 and SSBs of the second TRP 612. In other words, as the operation of the UE 621, the steps S602*a*, S602*b*, and S604 may be performed simultaneously or sequentially.

In the step S604, the UE 621 may search for an SSB corresponding to the SSB index included in the PDCCH order in the SSB transmission period.

In this case, if the corresponding SSB is not found, the UE 621 may transmit a search failure report message to the BS through the first TRP 611 in a step S606. Here, the failure to find the corresponding SSB may include a case where, even if the SSB is received, a received signal strength of the received SSB is equal to or less than a predetermined threshold.

Then, the BS may select one of the remaining SSB indexes belonging to the second TRP and configure a new PDCCH order including the selected SSB index and a reserved preamble index. In a step S608, the BS may retransmit the new PDCCH order including the newly selected SSB index and reserved preamble index to the UE 621 through the first TRP 611. Here, the preamble index informed previously, that is, the preamble reserved in the step S600, may be used as is, or a new reserved preamble index may be used.

In a step S610, the UE 621 may search for an SSB corresponding to the new SSB index included in the new PDCCH order. In the step S610, the operation of the first TRP 611 and second TRP 612 transmitting SSBs is not illustrated, but similarly to the steps S602*a* and S062*b*, the first TRP 611 and second TRP 612 each may transmit their SSBs in the SSB transmission period.

As a result of the SSB search in the step S610, if the UE 621 receives (or identifies) the SSB corresponding to the new SSB index included in the new PDCCH order, the UE 621 may transmit the reserved preamble in a PRACH period associated with the SSB. As described above, since this case corresponds to the case where the BS wants to add the new second TRP 612, the preamble transmitted by the UE 621 in the step S612 may be transmitted to the second TRP 612.

If the UE 621 fails to search for the corresponding SSB in the step S610, the UE 621 may transmit a search failure report message to the BS again through the first TRP 611 as in the step S606. Upon receiving the search failure report message again from the UE 621, the BS may repeat the above-described procedure until the UE 621 completes the RACH procedure by searching for all the remaining SSB indexes of the second TRP 612 or until there is no SSB to which the UE 621 can connect among the SSBs belonging to the second TRP 612.

The BS receiving the preamble through the second TRP 612 in the step S612 may transmit a second message, which is a response message, to the UE 621 through the second TRP 612 in a step S614. The second message (msg 2) may include a TA value and may include scheduling information.

In case of the RACH procedure based on the PDCCH order, unlike the RACH procedure for initial access, the procedure may be terminated when only the response message is received. In case of the intra-cell multi-TRP environment, since the first TRP 611 and second TRP 612 belong to the same BS, the BS already knows that the second TRP 612 transmits the response message to the UE 621. Therefore, in case of the intra-cell multi-TRP environment, the UE 621 may not need to report a result of the PDCCH order to the BS through the first TRP 611.

On the other hand, in case of the inter-cell multi-TRP environment, the first TRP 611 and second TRP 612 may belong to different BSs. Therefore, even if the second TRP 612 transmits the response message to the UE 621, the first BS to which the first TRP 611 belongs may not know this in real time. Of course, a second BS connected to the newly added second TRP 612 may inform the first BS 621 that the second TRP 612 has transmitted the response message to the UE 621. However, a delay may occur depending on a connection situation between the first BS and the second BS (e.g. communication delay for wired/wireless X2 connection between the base stations, etc.). In addition, a problem may occur in which traffic between the first BS and the second BS increases. Therefore, a clear method would be to transmit, to the first BS and through the first TRP 611, a report message (i.e. SSB index confirmation report message) including information on which beam of the second TRP 612 the UE 621 is connected to in a step S616.

In addition, although not described above, the PDCCH order may configure the terminal to report whether or not the terminal is connected to the second TRP. Therefore, the UE 621 may selectively perform or not the step S616 based on indication information on reporting on whether the terminal is connected to the second TRP. The case of configuring the indication information so that the terminal performs the step S616 of reporting whether the terminal is connected to the second TRP may correspond to the case of the inter-cell multi-TRP environment as described above, and the case of configuring the indication information so that the terminal does not perform the step S616 may correspond to the case of the intra-cell multi-TRP environment.

Figure 7:
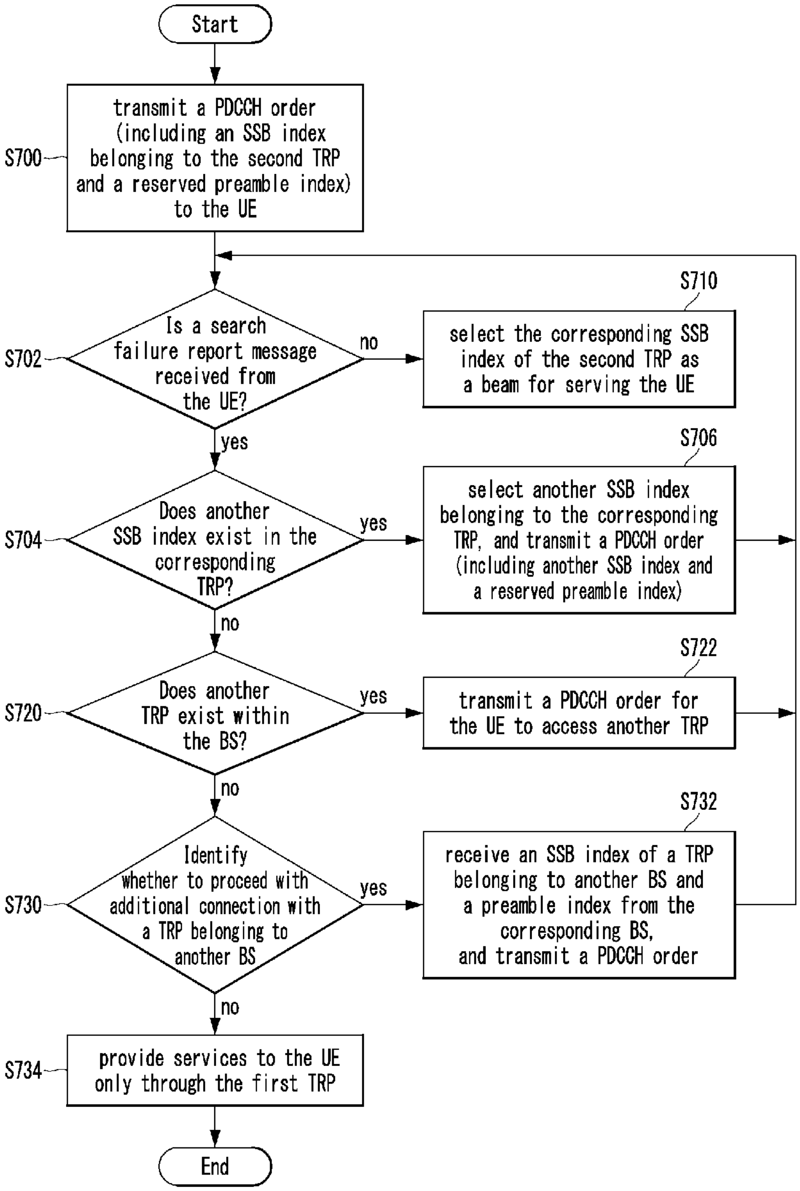
FIG. 7 is an operation flowchart when a BS adds a second TRP to a UE connected through a first TRP.

FIG. 7 is an operation flowchart when a BS adds a second TRP to a UE connected through a first TRP.

Before referring to FIG. 7, the UE may have performed the initial access procedure with the BS through the first TRP, and made association with the BS. Therefore, the UE may be in an RRC connected state with the BS. While the UE is connected, the BS may add the second TRP. As previously described in FIG. 6, a purpose of adding the second TRP may exist in various cases, and addition of the second TRP may be determined based on capability of the UE.

In a step S700, the BS may determine addition of the second TRP and transmit a PDCCH order to the UE to allow the UE to perform a random access procedure to the second TRP. The PDCCH order may include an SSB index belonging to the second TRP and a reserved preamble index as parameters.

In a step S702, the BS may identify whether a search failure report message is received from the UE. As a result of checking in the step S702, if a search failure report message is received from the UE, the BS may proceed to a step S704. Otherwise, the BS may proceed to a step S710. In addition, if the UE is configured to transmit an SSB index confirmation report message according to the PDCCH order as in the step S616 described previously in FIG. 6, in the step S702, the BS may identify whether the message received from the UE is a search failure report message or a SSB index confirmation report message for the PDCCH order.

As a result of identification in the step S702, if an SSB index confirmation report message according to the PDCCH order is received, if a search failure report message is not received from the UE within a preset time, or if the reception of the preamble for the UE's random access procedure is identified through the second TRP, the BS may proceed to the step S710.

Since the step S710 corresponds to a case when the UE has normally performed the random access procedure to the second TRP, the BS may select the corresponding SSB index of the second TRP as a beam for serving the UE, and provide services to the UE through the first TRP and the second TRP.

On the other hand, if a search failure report message is received from the UE as a result of the identification in the step S702, the BS may check whether another SSB index exists in the corresponding TRP (i.e. second TRP) in a step S704. If another SSB index exists as a result of checking in the step S704, the BS may proceed to a step S706. Otherwise, the BS may proceed to step a S720.

First, if another SSB index exists in the corresponding TRP (i.e. second TRP) and the BS proceeds to the step S706, the BS may select another SSB index belonging to the corresponding TRP and transmit a PDCCH order including the selected SSB index and a reserved preamble index to the UE. Then, the BS may perform again from the step S702. In this case, the same preamble as the previously transmitted preamble may be used as the reserved preamble if the TRP is not changed.

Meanwhile, if search failure report messages are received from the UE for all SSB indexes of the corresponding TRP (i.e. the selected second TRP), the BS may proceed to the step S720. In the step S720, the BS may identify whether another TRP exists within the BS. If another TRP exists, the BS may proceed to a step S722, and if no other TRP exists, the BS may proceed to a step S730.

If the BS proceeds to the step S722, the BS may select another TRP as the second TRP and transmit a PDCCH order to the UE to allow the UE to perform a random access procedure to the corresponding TRP. Thereafter, a procedure for identifying whether the UE can communicate based on SSB indexes of the corresponding TRP by performing the step S702 may be performed. In other words, the step S702 performed after the step S722 may be a procedure for allowing the UE to access the newly selected TRP.

Meanwhile, the case of proceeding to the step S730 may correspond to a case where PDCCH orders for all SSB indexes that can be used for the respective TRPs within in the BS have been transmitted, but search failure report messages for all the SSB indexes are received from the UE. Therefore, the BS may be in a state where only the first TRP among all TRPs of the BS can communication with the UE.

In this case, the BS may identify whether to proceed with additional connection with a TRP belonging to another BS in a step S730. Whether to proceed with an additional connection with a TRP belonging to another BS may be determined based on information preconfigured by a system administrator, or may be determined by the BS itself. Alternatively, the system administrator may configure the BS to make its own determination in specific cases. As a result of the identification in the step S730, if it is configured not to proceed with additional connection with a TRP belonging to another BS, or if the BS determines not to proceed with additional connection with a TRP belonging to another BS, the BS may proceed to a step S734 and provide services to the UE only through the first TRP.

On the other hand, as a result of the identification in the step S730, if it is configured to proceed with additional connection with a TRP belonging to another BS, or the BS determines to proceed with additional connection with a TRP belonging to another BS, the BS may proceed to a step S732 and request SSB index(es) and a preamble for a TRP belonging to another BS from the corresponding BS. Here, the another BS may be a BS adjacent to the BS (i.e. serving BS) that currently provides services to the UE. Upon receiving the SSB index(es) and preamble of the TRP belonging to the BS from the corresponding adjacent BS, the serving BS may select one of the SSB index(es) of the corresponding TRP, and transmit a PDCCH order including the selected SSB index and the reserved preamble index to the UE. Thereafter, the operations after the step S702 may be performed again. The step S702, which is performed after the step S732, may be a procedure for allowing the UE to access the TRP belonging to the adjacent BS.

As described in the procedure described with reference to FIGS. 6 and 7, the UE connected to the BS through the first TRP may detects the SSB to which the second TRP is designated by the BS, and perform a RACH procedure with the corresponding TRP based on a beam through which the SSB is transmitted. When the BS receives a preamble through the second TRP, it may transmit a response message to the UE. The response message may include a TA value as previously described in FIG. 5. The TA value included in the response message may be a TA value actually measured between the second TRP and the UE, or may be the same TA value as a TA value used between the UE and the first TRP that is already connected to the UE.

The fact that the TA value is determined as either the TA value actually measured between the second TRP and the UE or the TA value used between the first TRP and the UE may be due to a policy of the BS. In other words, the TA value between the second TRP and the UE may vary depending on a policy of the BS. For example, if the policy of the BS is established to maintain one timing advance group (AG) for all UEs connected to the BS, the TA value of the response message needs to be set to a 'TA between the first TRP and the UE. This is because the UE belongs to only one TAG and cannot have multiple different TA values, according to the policy of the BS.

On the other hand, if the policy of the BS allows multiple TAGs, and when a difference between the TA value between the second TRP and the UE and the TA value between the first TRP and the UE is large, and it is necessary to configure a new TAG, the BS may configure the TA value between the second TRP and the UE to a new TAG. In this case, a TA value corresponding to the new TAG may be assigned to the response message to the preamble. When assigning the TA value corresponding to the new TAG to the UE, if there are existing TAGs, the connection between the second TRP and the UE may be mapped to the existing TAG.

As a simple method to distinguish TAGs, beams belonging to the first TRP may be classified as belonging to a first TAG, and beams belonging to the second TRP may be classified as belonging to a second TAG. When a TAG is determined for each TRP with respect to the UE as described above, as many TAGs as the number of TRPs may exist. However, if TAGs as many as the number of TRPs are formed for each UE, management complexity and frequent TA updates may result in resource waste. Therefore, two adjacent TRPs may be grouped into one group and managed as one TAG. For example, if four TRPs belong to a BS, one group may be formed as including two TRPs. More specifically, if there are the first TRP, second TRP, third TRP, and fourth TRP in the BS, the first TRP and the second TRP may be grouped and managed as a first TAG, and the third TRP and the fourth TRP may be grouped and managed as a second TAG.

Hereinafter, methods for managing multiple TRPs as one TAG will be described.

Figure 8A:
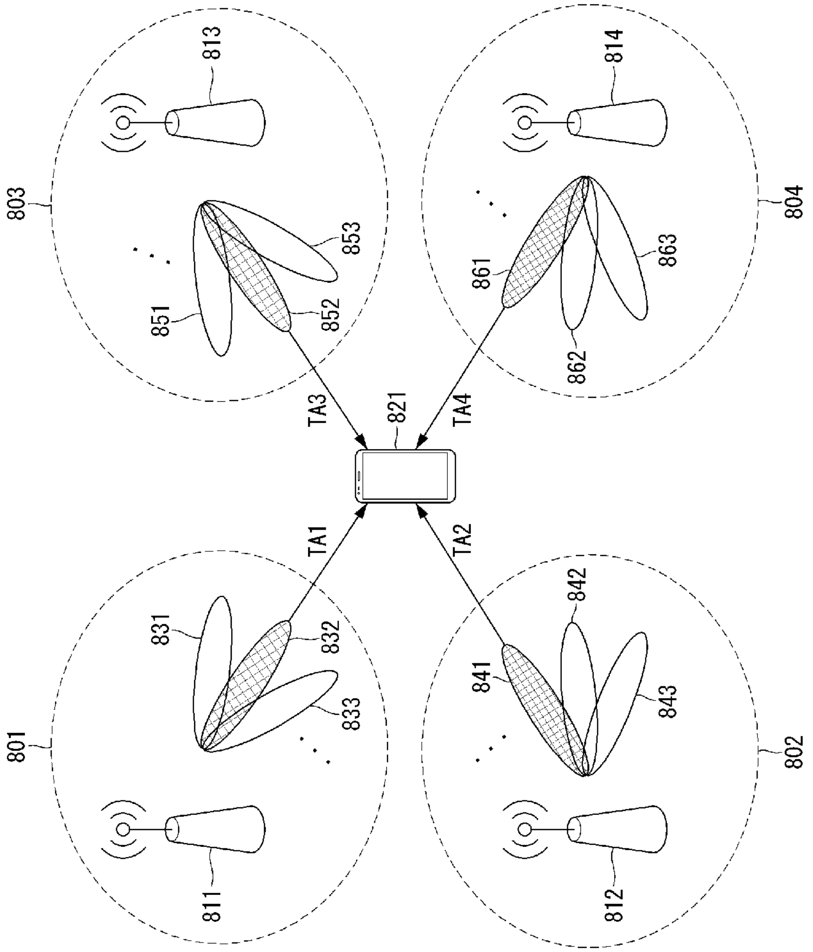
FIG. 8A is a conceptual diagram illustrating a method of configuring a different TAG for each TRP, with respect to a UE.

FIG. 8A is a conceptual diagram illustrating a method of configuring a different TAG for each TRP, with respect to a UE.

Referring to FIG. 8A, four different TRPs 811, 812, 813, and 814 may exist around a UE 821. The first TRP 811 may transmit signals (or data) using a plurality of downlink beams. Among the plurality of downlink beams that the first TRP 811 can form, three downlink beams 831, 832, and 833 are illustrated in FIG. 8A. FIG. 8A illustrates a case where the UE 821 can receive downlink signals (or data) using the second downlink beam 832 of the first TRP 811.

The second TRP 812 may also transmit signals (or data) using a plurality of downlink beams, and FIG. 8A illustrates three downlink beams 841, 842, and 843 among the plurality of downlink beams that the second TRP 812 can form. FIG. 8A illustrates a case where the UE 821 can receive downlink signals (or data) using the first downlink beam 841 of the second TRP 812.

The third TRP 813 may also transmit signals (or data) using a plurality of downlink beams, and FIG. 8A illustrates three downlink beams 851, 852, and 853 among the plurality of downlink beams that the third TRP 813 can form. FIG. 8A illustrates a case where the UE 821 can receive downlink signals (or data) using the second downlink beam 852 of the third TRP 813.

The fourth TRP 814 may also transmit signals (or data) using a plurality of downlink beams, and FIG. 8A illustrates three downlink beams 861, 862, and 863 among the plurality of downlink beams that the fourth TRP 814 can form. FIG. 8A illustrates a case where the UE 821 can receive downlink signals (or data) using the first downlink beam 861 of the fourth TRP 814.

As illustrated in FIG. 8A, since each of the TRPs 811, 812, 813, and 814 belongs to each TAG, the UE 821 may have a different TA value with each of the TRPs 811, 812, 813, and 814. As illustrated in FIG. 8A, a TA1 value is set between the UE 821 and the first TRP 811, a TA2 value is set between the UE 821 and the second TRP 812, a TA3 value is set between the UE 821 and the third TRP 812, and a TA4 value is set between the UE 821 and the fourth TRP 814. In other words, a first TAG 801 may include only the first TRP 811, a second TAG 802 may include only the second TRP 812, a third TAG 803 may include only the third TRP 813, and a fourth TAG 804 may include only the fourth TRP 814. Because the TAG is configured for each TRP, all beams of a specific TRP have the same TA value.

The TRPs 811, 812, 813, and 814 and the UE 821 illustrated in FIG. 8A may have the same components as the components previously described in FIG. 2 or may include at least some of the components.

Figure 8B:
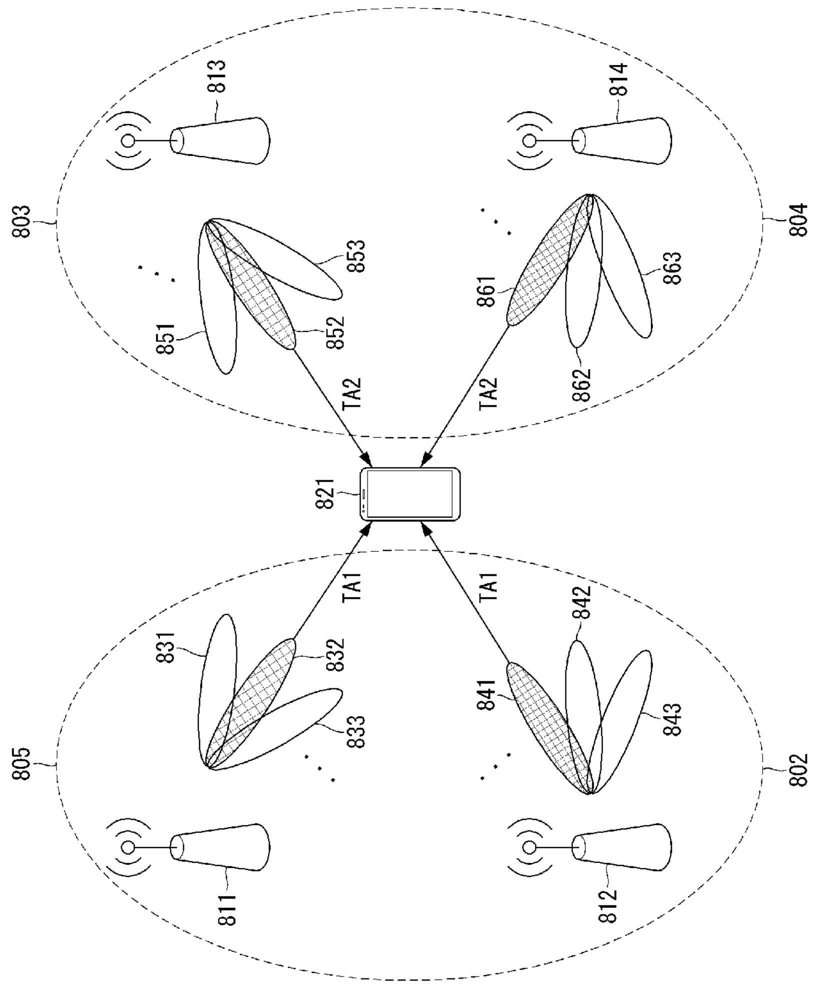
FIG. 8B is a conceptual diagram illustrating a case where one TAG is configured for two different TRPs.

FIG. 8B is a conceptual diagram illustrating a case where one TAG is configured for two different TRPs.

Referring to FIG. 8B, as in FIG. 8A, four different TRPs 811, 812, 813, and 814 may exist around the UE 821. The first TRP 811 to the fourth TRP 814 may transmit signals (or data) using a plurality of downlink beams, and FIG. 8B illustrates that each of the TRPs 811 to 814 has three downlink beams (e.g. 831, 832, 833) similarly to the case of FIG. 8A. In this case, the UE 821 may receive downlink signals (or data) by using the second downlink beam 832 of the first TRP 811, first downlink beam 841 of the second TRP 812, second downlink beam 852 of the third TRP 813, and first downlink beam 861 of the fourth TRP 814.

FIG. 8B illustrates a case where one TAG is configured for two TRPs. More specifically, a first TAG 805 may include the first TRP 811 and the second TRP 812, and a second TAG 806 may include the third TRP 813 and the fourth TRP 814.

As described above, the same TA value is used within one TAG. Therefore, since the first TRP 811 and the second TRP 812 belong to the first TAG 805, TA values between all beams of all TRPs belonging to the first TAG 805 and the UE 821 may be set to a TA1 value. Since the third TRP 813 and the fourth TRP 814 belong to the second TAG 806, TA values between all beams of all TRPs belonging to the second TAG 806 and the UE 821 may be set to a TA2 value. Accordingly, the UE 821 may need to apply the TA1 value when transmitting uplink data to the first TRP 811 and the second TRP 812 belonging to the first TAG 805 and may need to apply the TA2 value when transmitting uplink data to the third TRP 813 and fourth TRP 814.

Meanwhile, in FIG. 8B, it is assumed that each of the first TAG 805 and the second TAG 806 includes two TRPs. However, when there are four TRPs around the UE 821, the first TAG 805 may be configured to include three TRPs and the second TAG 806 may be configured to include only one TRP based on the positions of the TRPs and the position of the UE 821. In FIG. 8B, only the case where four TRPs exist around the UE 821 is illustrated. However, there may be more than five TRPs around the UE 821. Each TAG may be configured in various modified forms based on the number of TRPs arranged around the UE 821 and the position of the UE 821. However, since all forms of modification cannot be described as examples in the present disclosure, various modifications based on the contents described above should be considered to be within the scope of the present disclosure at the level of those skilled in the art.

In addition, the TRPs 811, 812, 813, and 814 and the UE 821 illustrated in FIG. 8B may have the same components as the components previously described in FIG. 2 or may include at least some of the components.

Figure 8C:
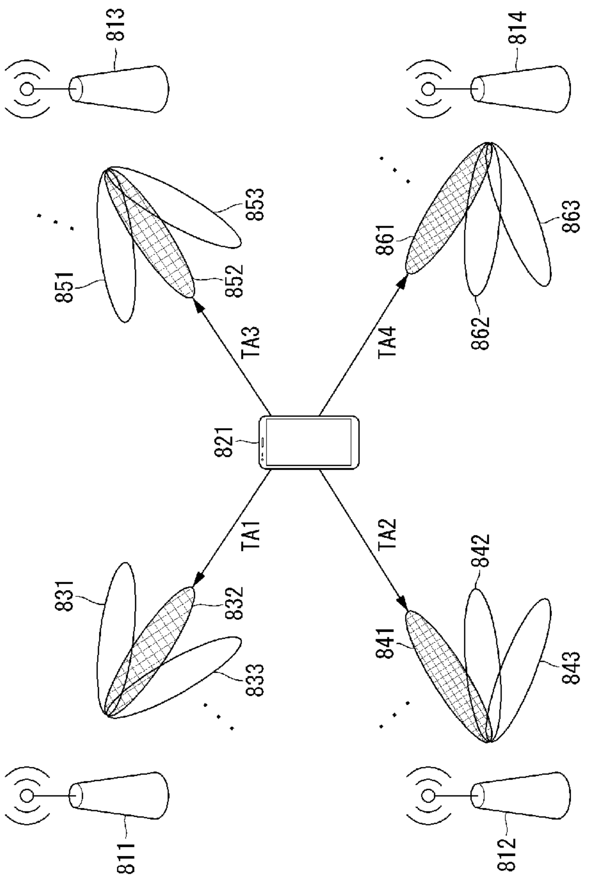
FIG. 8C is a conceptual diagram illustrating a case where a TAG is configured for each beam of a TRP.

FIG. 8C is a conceptual diagram illustrating a case where a TAG is configured for each beam of a TRP.

FIG. 8C illustrates the same situation as FIG. 8A described above. In other words, FIG. 8C illustrates the case where four different TRPs 811, 812, 813, and 814 exist around the UE 821. Additionally, the UE 821 may receive downlink signals (or data) by using the second downlink beam 832 of the first TRP 811, first downlink beam 841 of the second TRP 812, second downlink beam 852 of the third TRP 813, and first downlink beam 861 of the fourth TRP 814.

Unlike FIG. 8A, FIG. 8C illustrates a case where a TAG is configured for each beam. Therefore, it should be noted that no separate reference number is used for a TAG in FIG. 8C. As shown in FIG. 8C, a TA value for each beam of each TRP may be set for a specific UE. In this case, as described in FIG. 8A, the UE 821 may use a TA1 value when transmitting uplink data to the first TRP 811, use a TA2 value when transmitting uplink data to the second TRP 812, use a TA3 value when transmitting uplink data to the third TRP 813, and use a TA4 value when transmitting uplink data to the fourth TRP 814. Accordingly, in case of FIG. 8C, TAGs as many as the number of beams may be configured for each of the TRPs.

Meanwhile, the method of allocating a separate TAG for each beam as shown in FIG. 8C may have an advantage of increasing TA accuracy and uplink data transmission performance. On the other hand, the method of allocating a separate TAG for each beam as shown in FIG. 8C not only requires the UE 821 to store a mapping relationship between a TAG and a beam index or a mapping relationship between a TAG and a TRP and information on TA values for the respective TAGs, but also requires continuous update of the TA values. This may increase management complexity in the UE 821 and may cause resource wastes.

In addition, the TRPs 811, 812, 813, and 814 and the UE 821 illustrated in FIG. 8C may have the same components as the components previously described in FIG. 2 or may include at least some of the components.

Figure 8D:
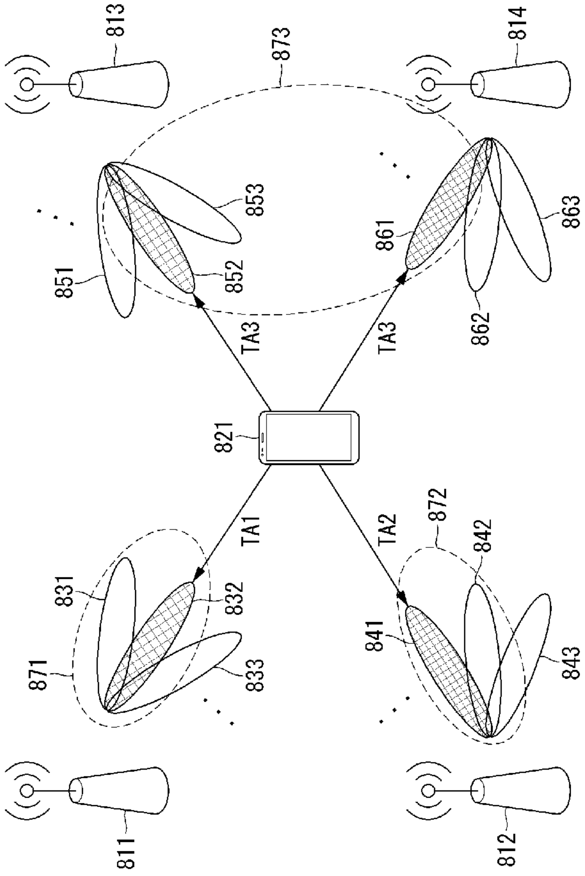
FIG. 8D is a conceptual diagram illustrating a case where a TAG is configured for a plurality of beams.

FIG. 8D is a conceptual diagram illustrating a case where a TAG is configured for a plurality of beams.

FIG. 8D illustrates the same form as previously described in FIGS. 8A and 8C, except for TAG configuration. For example, FIG. 8D illustrates the case where four different TRPs 811, 812, 813, and 814 exist around the UE 821. Additionally, the UE 821 may receive downlink signals (or data) by using the second downlink beam 832 of the first TRP 811, first downlink beam 841 of the second TRP 812, second downlink beam 852 of the third TRP 813, and first downlink beam 861 of the fourth TRP 814.

In this case, as illustrated in FIG. 8D, a plurality of beams formed by one TRP may belong to one TAG, or beams formed by different TRPs may belong to one TAG. In FIG. 8D, the first beam 831 and the second beam 832 of the first TRP 811 may belong to a first TAG 871, and the first beam 841 and the second beam 842 of the second TRP 812 may belong to a second TAG 872. The beams of the first TRP 811 and the second TRP 812 may show an example of a case where beams within the same TRP belong to one TAG.

On the other hand, the second beam 852 and the third beam 853 of the third TRP 813, and the first beam 861 of the fourth TRP 813 may belong to a third TAG 873. In other words, the beam(s) of the third TRP 813 and the beam(s) of the fourth TRP 814 belong to one TAG. As described above, beams of different TRPs may belong to one TAG. Therefore, the UE needs to apply the same TA value when transmitting uplink data to the third TRP 813 and/or the fourth TRP 814.

Compared to the method illustrated in FIG. 8C, when using the method illustrated in FIG. 8D, TAG management only needs to be performed for three TAGs, which has an advantage of reducing complexity of controls such as TA updates. This is because, if multiple beams are configured to belong to one TAG, beams in different TRPs can be grouped as the same TAG, thereby increasing efficiency. For example, if there is a UE receiving services from both the TRPs 811 and 812 at a middle position between the first TRP 811 and the second TRP 812, the UE 821 may use the same TA value for the two TRPs 811 and 812. Even in this case, the UE 821 may need to receive and manage TA values from the two different TRPs when the two TRPs 811 and 812 do not belong to one TAG or beams of the two TRPs do not belong to one TAG. In other words, if the TRPs 811 and 812 belong to different TAGs, TA update need to be performed for each different TAG.

However, when beams of different TRPs are configured to belong to one TAG as shown in FIG. 8D, TA update only needs to be performed for one TAG, thereby reducing control complexity.

In FIGS. 8A to 8D described above, various methods for configuring TAG(s) have been described through examples. When multiple TRPs belong to one TAG, the TRPs may belong to the same BS or different BSs. When the UE performs uplink transmission with TRPs belonging to a specific TAG, the UE may apply the same TA value regardless of whether the TRPs belonging to the specific TAG belong to the same BS or the TRPs belonging to the specific TAG belong to different BSs.

In addition, the TRPs 811, 812, 813, and 814 and the UE 821 illustrated in FIG. 8D may have the same components as the components previously described in FIG. 2 or may include at least some of the components.

Figure 9A:
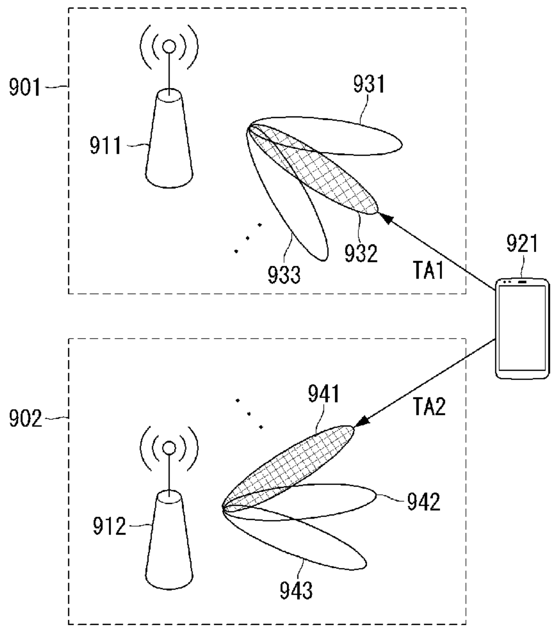
FIG. 9A is a conceptual diagram illustrating uplink transmission to different TRPs when a TAG is configured for each TRP.
Figure 9B:
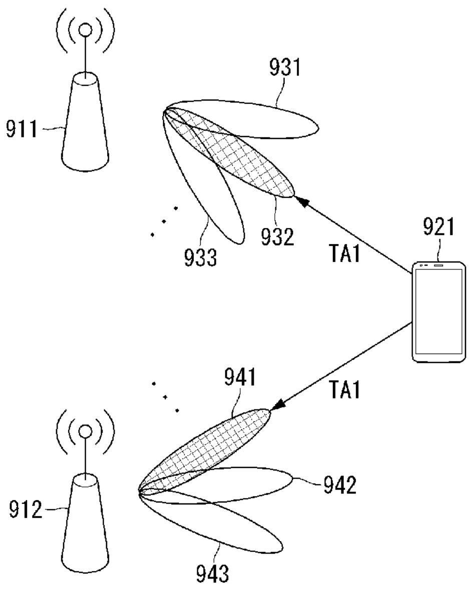
FIG. 9B is a conceptual diagram illustrating uplink transmission when beams of different TRPs belong to one TAG.

FIG. 9A is a conceptual diagram illustrating uplink transmission to different TRPs when a TAG is configured for each TRP, and FIG. 9B is a conceptual diagram illustrating uplink transmission when beams of different TRPs belong to one TAG.

FIGS. 9A and 9B illustrate the same form except for TAG configuration. For example, two different TRPs 911 and 912 may exist around a UE 921. FIGS. 9A and 9B illustrate three downlink beams 931, 932, and 933 among a plurality of downlink beams that the first TRP 811 can form. The UE 921 may receive downlink signals (or data) using a second downlink beam 932 of the first TRP 911. Accordingly, the UE 921 may perform uplink transmission through a transmission beam corresponding to the second downlink beam 932 of the first TRP 911.

In addition, FIGS. 9A and 9B illustrate three downlink beams 941, 942, and 943 among a plurality of downlink beams that the second TRP 812 can form. The UE 921 may receive downlink signals (or data) using a first downlink beam 941 of the second TRP 912. Accordingly, the UE 921 may perform uplink transmission through a transmission beam corresponding to the first downlink beam 941 of the second TRP 912.

Referring to FIG. 9A, all beams 931, 932, and 933 of the first TPR 911 belong to a first TAG 901, and all beams 941, 942, and 943 of the second TRP 912 belong to a second TAG 902. Accordingly, the UE 921 may perform uplink transmission using a TA1 value when transmitting uplink signals (or data) to the first TRP 911 belonging to the first TAG 901 and perform uplink transmission using a TA2 value when transmitting uplink signals (or data) to the second TRP 912 belonging to the second TAG 902. When a TAG is configured for each TRP as shown in FIG. 9A, the UE 921 may need to perform TA update for each group.

Referring to FIG. 9B, the second beam 932 of the first TRP 911 and the first beam 941 of the second TRP 912 may belong to one TAG. It should be noted that in FIG. 9B, a TAG is not separately indicated for identification. As shown in FIG. 9B, although the beams 932 and 941 belong to different TRPs 911 and 912, when they belong to one TAG, the UE 921 may perform uplink transmissions using the same TA value when transmission uplink signals (or data) to the different TRPs.

As shown in FIG. 9B, if the beams 932 and 941 belonging to different TRPs 911 and 912 are configured to belong to one TAG, complexity is reduced when the UE performs TA update. This will be described in contrast to the case illustrated in FIG. 9A.

In the case of FIG. 9A, when performing TA update, the UE 921 needs to perform a TA update for the first TAG 901 and a TA update for the second TAG 902. In other words, in the case of FIG. 9A, two TA update procedures need to be performed. On the other hand, in the case of FIG. 9B, since the beams 932 and 941 of different TRPs 911 and 912 belong to one TAG, only one TA update procedure is required. Therefore, since the TA update procedure in the case of FIG. 9B is reduced compared to the case of FIG. 9A, complexity is reduced.

However, the process of configuring different beams of different TRPs to belong to one TAG as shown in FIG. 9B requires more considerations than configuring a TAG for each TRP. For example, additional operations may be required, such as measuring which beams have similar TA values with respect to which UE. Therefore, various combinations, such as selecting one of the two methods or a mixture of the two methods, may be used depending on a situation of the BS(s). In the present disclosure described below, various types of TAG configuration methods will be described.

In FIG. 6 described above, the exemplary embodiment of the process in which the BS selects the second TRP for the UE has been described. Based on what has been described in FIG. 6, the BS may request the UE to search for SSBs by selecting beams belonging to the second TRP one by one. However, in this case, if the UE does not detect the corresponding SSB index, the UE needs to be requested to search for other SSBs again. The search procedure should be repeated as many times as the maximum number of beams in the second TRP. Additionally, if SSB search for the second TRP fails, the BS needs to repeat the above process by using other TRP(s) belonging to neighbor cell(s).

In addition, the TRPs 911 and 912 and the UE 921 illustrated in FIGS. 9A and 9B may have the same components as the components previously described in FIG. 2 or may include at least some of the components.

The method described in FIG. 6 has the advantage of enabling multi-TRP transmission without significant changes in terms of the current technical specifications. However, in the worst case, it may result in a lot of time and resource waste until the UE searches for an appropriate beam of the second TRP. Therefore, the present disclosure additionally proposes an efficient TRP selection method that can reduce time and resource waste in addition to the method previously described in FIG. 6.

Figure 10:
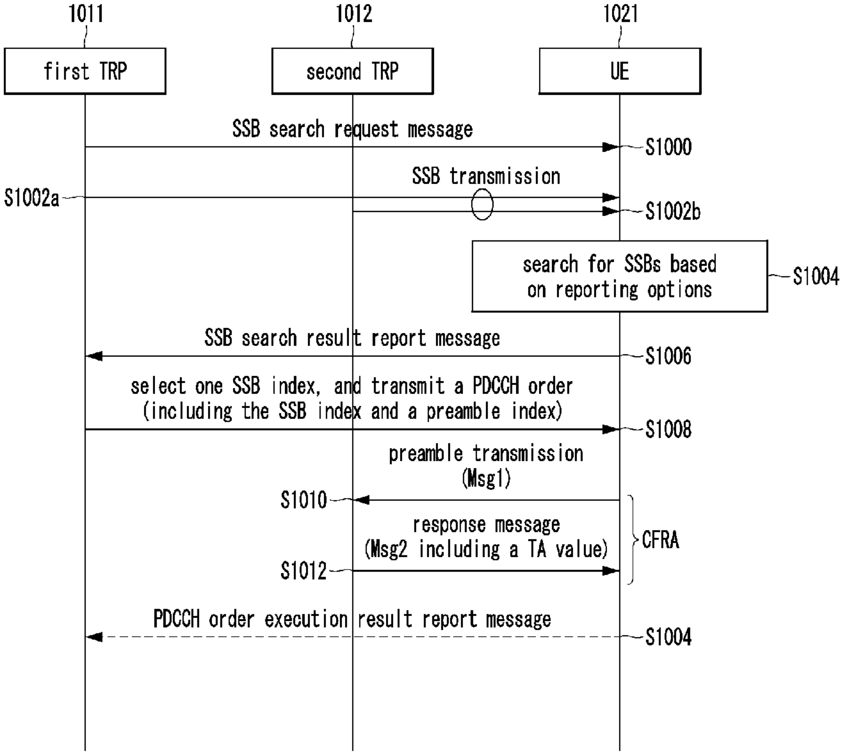
FIG. 10 is a sequence chart illustrating TRP selection and beam selection procedures when a BS wants to serve a UE with multiple beams.

FIG. 10 is a sequence chart illustrating TRP selection and beam selection procedures when a BS wants to serve a UE with multiple beams.

In FIG. 10, it is assumed that a first TRP 1011 and a second TRP 1012 are TRPs belonging to a BS (not shown in FIG. 10). In other words, it is assumed that the first TRP 1011 and the second TRP 1012 are connected below the BS. Additionally, it is assumed that a UE 1021 is in a radio resource control (RRC) connected state with the BS through the first TRP 1011.

The BS may indicate the first TRP 1011 to transmit an SSB search request message to the UE 1021 through RRC signaling. Accordingly, in a step S1000, the first TRP 1011 may transmit an SSB search request message to the UE 1021. Accordingly, in the step S1000, the UE 1021 may receive the SSB search request message from the first TRP 1011.

In the exemplary embodiment of FIG. 10, the case where the BS transmits the SSB search request message to the UE 1021 through the first TPR 1011 by using an RRC message has been described. However, the SSB search request message may use a message form other than the RRC message. For example, the BS may transmit the SSB search request message to the UE 1021 through the first TPR 1011 by using a MAC CE or DCI message. The SSB search request message may include an SSB search information element (IE) according to the present disclosure. The SSB search IE may include SSB search options according to the present disclosure. The SSB search options according to the present disclosure may include at least one of fields described below. In other words, the SSB search options may include one or more of the fields described below.

[SSB Search Options]

- SSB search exclusion list: The UE should not search for SSB indexes included in this field. When delivered initially to the UE, this field may include only SSB indexes currently being serviced by the first TRP or may include only SSB indexes belonging to the first TRP. If SSB indexes belonging to the first TRP are included here, it means that services will not be provided through beams belonging to the first TRP (i.e. they are not targets for the SSB search according to the present disclosure).
- Inter-cell SSB: This is an option that indicates whether to perform search including inter-cell SSBs. If this value is disabled, the UE searches only for SSBs of TRPs belonging to the BS (i.e. searches only for SSBs with the same PCI), and if this value is enabled, the UE also searches for SSBs of TRPs of neighbor cells.
- The maximum number of SSBs: This indicates the maximum number of SSBs reported by the UE. The UE reports SSBs that are smaller than or equal to this value among all SSBs.

Reporting Options

- Order: This indicates a reporting order of SSB indexes reported by the UE to the base station. For example, the reporting order may be an order in which a signal strength is large, an order in which a signal strength is small, or the like.
- Metric: This indicates whether to include various metrics such as CQI and RSSI.
- PCI: This indicates whether to report an SSB index and a PCI together when the inter-cell SSB option is enabled.
- PDCCH order execution result report: This indicates whether to report a result of executing a PDCCH order for a selected SSB. When this value is set, contents to be reported may be indicated in subfield(s) below.
- TA: TA value for a beam connected after PDCCH order execution.
- Metric: Signal measurement values such as CQI and RSSI for a beam connected after PDCCH order execution.
- Others Others 'Others' fields in the SSB search options and/or other fields in the reporting options described above may refer to fields that will be added in the future. The options may be used alone or in part, or only options in the subfields may be used.

The first TRP 1011 and the second TRP 1021 may transmit SSBs according to an SSB transmission periodicity. In FIG. 10, a step in which the first TRP 1011 transmits SSBs is illustrated as a step S1002*a*, and a step in which the second TRP 1012 transmits SSBs is illustrated as a step S1002*b*.

Accordingly, the UE 1021 may receive SSB(s) from the first TRP 1011 and the second TRP 1012 in the steps S1002*a* and S1002*b*. In a step S1004, the UE 1021 may perform SSB search based on the reporting options included in the SSB search request message received in the step S1000. As described above, the steps S1002*a*, S1002*b*, and S1004 are operations performed simultaneously, but it should be noted that they are illustrated sequentially for convenience of description and ease of understanding.

The searching for SSBs may be a procedure in which the UE 1021 receives SSBs transmitted through a plurality of beams and searches for SSB(s) whose received signal strength is equal to or greater than a predetermined threshold. The UE 1021 may generate an SSB search result report message based on a result of the SSB search in the step S1004. In this case, the SSB search result report message may be generated based on the reporting options in the SSB search options described above. In a step S1006, the UE 1021 may transmit the SSB search result report message to the first TRP 1011.

The BS may receive the SSB search result report message transmitted by the UE 1021 through the first TRP 1011. The BS may select an additional beam and/or additional TRP to serve the UE 1021 based on the SSB search result report message transmitted by the UE 1021. The BS' selection of an additional beam and/or additional TRP may result in selecting one SSB. Therefore, the BS that selects one SSB may transmit a PDCCH order to the UE 1021 through the first TRP 1011 in a step S1008. The PDCCH order may include information on one SSB selected by the BS among the SSBs included in the SSB search result report message. In other words, an index of the SSB selected by the BS and a preamble index may be included in the PDCCH order. In this case, if the SSB selected by the BS belongs to another cell, a PCI of the cell may be added in the PDCCH order. If the index of the selected SSB is unique within cells including neighbor cells, the PCI of the cell may not need to be included in the PDCCH order.

The UE 1021 receiving the PDCCH order in the step S1008 may perform a contention-free random access (CFRA) procedure based on the SSB indicated by the PDCCH order. A reason for performing CFRA is that the preamble index included in the PDCCH order is a resource reserved by the BS and cannot be used by UEs performing initial access, so collisions with random access of other UEs do not occur. If all reserved preambles are exhausted, a contention-based random access (CBRA) may be performed. Although FIG. 10 shows an example of performing CFRA, the present disclosure may be applied not only to CFRA but also to CBRA.

In this case, if the selected SSB belongs to a neighbor cell, the BS may receive information on a preamble index available and reserved in a BS of the neighbor cell from the BS of the neighbor cell in advance, and include it as a parameter in the PDCCH order.

Based on the above-described procedure, the UE 1021 may transmit a preamble, that is, Msg1, to the second TRP 1012 in the step S1010. If the second TRP 1012 receives the preamble based on the CFRA scheme in the step S1010, the second TRP 1012 may transmit a response message (i.e. Msg2) to the UE 1021 in a step S1012. It should be noted that FIG. 10 does not illustrate a case where the random access preamble collides with another UE based on the CBRA scheme. However, based on the present disclosure, if random access preambles collide in the CBRA scheme, the UE 1021 may perform the random access procedure again.

When the UE 1021 receives the second message (i.e. Msg2) (including a TA value) from the second TRP 1012, the procedure according to the PDCCH order may be completed.

In addition, if the TA subfield within the 'PDCCH order execution result report' subfield in the reporting options of the SSB search options described above is enabled, the UE 1021 may report the TA value obtained in the step S1014 to the BS through the first TRP 1011.

In addition, the TRPs 1011 and 1012 and the UE 1021 illustrated in FIG. 10 may have the same components as the components previously described in FIG. 2 or may include at least some of the components.

Figure 11:
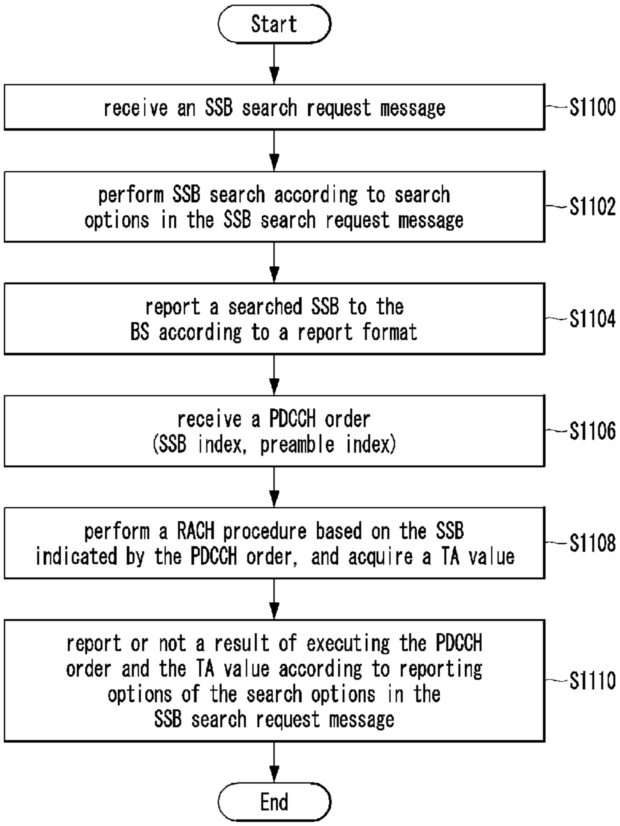
FIG. 11 is a flow diagram according to an exemplary embodiment of an operation of a UE based on an additional TRP or additional beam selection procedure.

FIG. 11 is a flow diagram according to an exemplary embodiment of an operation of a UE based on an additional TRP or additional beam selection procedure.

Referring to FIG. 11, the UE may receive the SSB search request message in a step S1100. This may correspond to the step S1000 previously described in FIG. 10. Therefore, the SSB search request message may include the SSB search options and/or reporting options described in FIG. 10.

In a step S1102, the UE may perform SSB search based on the search options in the SSB search request message. Searching for SSBs may be a procedure in which the UE receives SSBs transmitted through a plurality of beams and searches for SSB(s) whose received signal strength is greater than or equal to a predetermined threshold. This may correspond to the steps S1002*a*, S1002*b*, and S1004 previously described in FIG. 10.

In a step S1104, the UE may transmit information on the searched SSB(s) to the BS based on a report format. Here, the report format may be determined based on the reporting options included in the search options of the SSB search request message. Based on the report format, the UE may transmit information on the searched SSB(s) to the BS. In this case, if there is one searched SSB, the terminal may report information on the one SSB, and if there are more than two searched SSBs, the terminal may report information on the searched SSBs after sorting them according to an order indicated by the reporting options. This may correspond to the step S1006 previously described in FIG. 10.

In a step S1106, the UE may receive a PDCCH order. The PDCCH order may include an SSB index and a preamble index. Here, the SSB index may indicate one of the SSB(s) previously reported by the UE to the BS. Additionally, the preamble index may be a preamble index capable of performing the CFRA procedure, as previously described in FIG. 10, or it may be a preamble index capable of performing the CBRA procedure. This may correspond to the step S1008 previously described in FIG. 10.

In a step S1108, the UE may perform a RACH procedure based on the SSB indicated by the PDCCH order and obtain a TA value from the BS. Referring to FIG. 10 described above, the UE may transmit a random access preamble to the second TRP 1012 and receive a response message including a TA value from the second TRP 1012. In other words, this may correspond to the steps S1010 and S1012 described in FIG. 10.

In a step S1110, the UE may or may not report a result of executing the PDCCH order based on the reporting option included in the search options of the SSB search request message. Here, a case of reporting a result of executing the PDCCH order may correspond to a case that the corresponding reporting option included in the search options of the SSB search request message is enabled, and a case of not reporting the result of executing the PDCCH order may correspond to a case that the corresponding reporting option included in the search options of the SSB search request message is disabled. Therefore, the step S1110 may correspond to the step S1014 previously described in FIG. 10.

Figure 12A:
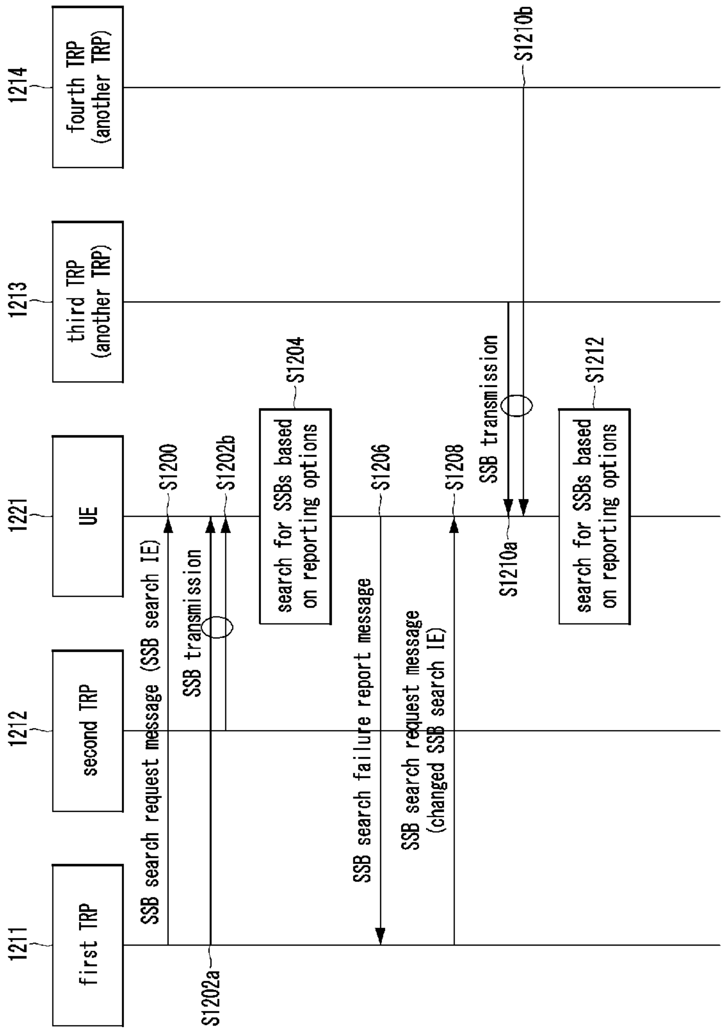
FIG. 12A is a partial flowchart illustrating a part of a re-search procedure when a UE fails to search for SSB during TRP selection and beam selection when a BS wants to serve the UE with multiple beams.
Figure 12B:
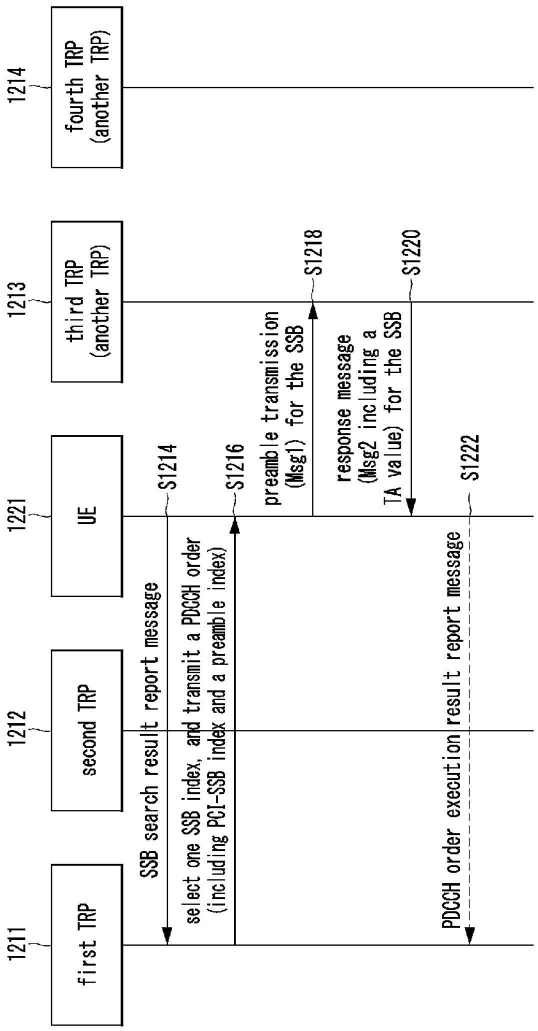
FIG. 12B is a partial flowchart illustrating the remaining part of the re-search procedure when the UE fails to search for SSB during TRP selection and beam selection when the BS wants to serve the UE with multiple beams.

FIG. 12A is a partial flowchart illustrating a part of a re-search procedure when a UE fails to search for SSB during TRP selection and beam selection when a BS wants to serve the UE with multiple beams, and FIG. 12B is a partial flowchart illustrating the remaining part of the re-search procedure when the UE fails to search for SSB during TRP selection and beam selection when the BS wants to serve the UE with multiple beams.

FIGS. 12A and 12B are continuous flowcharts and illustrated as being divided since they cannot be shown in one drawing.

In FIG. 12, it is assumed that a first TRP 1211 and a second TRP 1212 are TRPs belonging to a BS (not shown in FIG. 12). In other words, it is assumed that the first TRP 1211 and the second TRP 1212 are connected below the BS. Additionally, it is assumed that the UE 1221 is in an RRC connected state with the BS through the first TRP 1211. In addition, FIG. 12 further includes a third TRP 1213 and a fourth TRP 1214 belonging to other BS(s). If the first TRP 1211 and the second TRP 1212 belong to a first BS, the third TRP 1213 and the fourth TRP 1214 may belong to a second BS. As another example, the third TRP 1213 may belong to the second BS, and the fourth TRP 1214 may belong to a third BS. In the following description, for convenience of description, it may be assumed that the BS to which the first TRP 1211 and the second TRP 1212 belong is the first BS, and the BS to which the third TRP 1213 and the fourth TRP 1214 belong is the second BS.

The first BS may indicate the first TRP 1211 to transmit an SSB search request message to the UE 1021 through RRC signaling, MAC CE, or DCI message. Accordingly, in a step S1200, the first TRP 1211 may transmit an SSB search request message to the UE 1221. Accordingly, in the step S1200, the UE 1221 may receive the SSB search request message from the first TRP 1211. The SSB search request message may include an SSB search IE as previously described in FIG. 10. The SSB search IE may include other fields including the SSB search options and reporting options.

The first TRP 1211 and the second TRP 1221 may transmit SSBs according to an SSB transmission periodicity.

In FIG. 12, a step in which the first TRP 1211 transmits SSBs is illustrated as a step S1202*a*, and a step in which the second TRP 1212 transmits SSBs is illustrated as a step S1202*b*. Accordingly, the UE 1221 may receive SSB(s) from the first TRP 1211 and the second TRP 1212 in the steps S1202*a* and S1202*b*. In a step S1204, the UE 1221 may perform SSB search based on the reporting options included in the SSB search request message received in the step S1200. The searching for SSBs may be a procedure in which the UE 1221 receives SSBs transmitted through a plurality of beams and searches for SSB(s) whose received signal strength is equal to or greater than a predetermined threshold.

In this case, if the UE fails in the SSB search as a result of the search in the step S1204, the UE 1221 may generate an SSB search failure report message. The UE 1221 may transmit the search failure report message to the first BS through the first TRP 1211 in a step S1206.

Upon receiving the SSB search failure report message from the UE 1221, the first BS may change the search options of the SSB search IE to request re-search or may not proceed with the search any further, and provide services to the UE 1221 only through the first TRP 1211.

FIG. 12A illustrates a case where the first BS requests re-search. If the re-search is required, the first BS may extend a range of the re-search to TRPs belonging to the second BS. In this case, as described above, the first BS may receive information for searching for the TRPs belonging to the second BS in advance from the second BS.

It should be noted that in FIG. 12A, the procedure for the first BS to receive information on the TRPs from the second BS is omitted.

In a step S1208, the first BS may transmit an SSB search request message including the changed SSB search IE to the UE 1221 through the first TRP 1211. Accordingly, the UE 1221 may receive the SSB search request message including the changed SSB search IE.

In this case, as described above, the SSB search request message may also indicate to search for SSBs transmitted through beams belonging to another cell, that is, a TRP belonging to the second BS. Additionally, the third TRP 1213 and fourth TRP 1214 belonging to the second BS may transmit SSBs based on an SSB transmission periodicity. In FIG. 12, a step in which the third TRP 1213 transmits SSBs is illustrated as a step S1210*a*, and a step in which the fourth TRP 1214 transmits SSBs is illustrated as a step S1210*b*.

Accordingly, the UE 1221 may receive SSB(s) from the third TRP 1213 and the fourth TRP 1214 in the steps S1210*a* and S1210*b*. Ina step S1212, the UE 1221 may perform SSB search based on the reporting options included in the SSB search request message received in the step S1208. In other words, the UE 1221 may perform SSB search on beams belonging to another cell (i.e. cell having a PCI different from that of the current cell) in response to the SSB search request message. The searching for SSBs may be a procedure in which the UE 1221 receives SSBs transmitted through a plurality of beams and searches for SSB(s) whose received signal strength is equal to or greater than a predetermined threshold.

Referring to FIG. 12B, the UE 1221 may generate an SSB search result report message based on a result of the SSB search in the step S1212. In this case, the SSB search result report message may be generated based on the reporting options in the SSB search options described above. Here, the SSB search result report message may include a result of searching for the third TRP 1213 and fourth TRP 1214 belonging to the second BS. In a step S1214, the UE 1221 may transmit the SSB search result report message to the first TRP 1211. Since the UE 1221 is currently connected to the first BS through the first TRP 1211, the UE 1221 may transmit the SSB search result report message to the first TRP 1211.

The first BS may receive the SSB search result report message transmitted by the UE 1221 through the first TRP 1211. The first BS may select an additional beam and/or additional TRP to serve the UE 1221 based on the SSB search result report message transmitted by the UE 1221. The first BS' selection of an additional beam and/or additional TRP may result in selecting one SSB. Therefore, the first BS that selects one SSB may transmit a PDCCH order to the UE 1221 through the first TRP 1211 in a step S1216. The PDCCH order may include information on one SSB selected by the first BS among the SSBs included in the SSB search result report message. In other words, an index of the SSB selected by the first BS and a preamble index may be included in the PDCCH order. In this case, since the SSB selected by the first BS belongs to another cell, the PDCCH order may further include a PCI of the corresponding cell. If the SSB index is unique within cells including neighbor cells, the PCI of the corresponding cell may not need to be included in the PDCCH order.

In order for the UE 1221 to perform a RACH procedure with a TRP belonging to another cell, the PCI, SSB index, and preamble are required. However, when the first BS transmits the PDCCH order, the first BS may be configured to sequentially assign numbers to the SSBs in the SSB search result report message transmitted by the UE, and transmit only a number corresponding the selected SSB, without a need to transmit both the PCI and SSB index of the selected SSB. For example, it may be assumed that the SSB search result report message reported by the UE 1221 to the first BS through the first TRP 1211 in the step S1214 includes three items 'PCI1-SSB index1', 'PCI1-SSB index2', and 'PGI2-SSB index3'. When the three items are included in the SSB search result report message, the first BS may sequentially assign indexes 0, 1, and 2 to the three items, and the first BS may transmit the PDCCH order through the first TRP 1211 by indicating the index 1 as a parameter instead of 'PCI1-SSB index2'.

Meanwhile, the preamble index of the PDCCH order may be a reservation-based preamble requested in advance by the first BS from the neighbor second BS (i.e. BS to which the beam for which the UE searched for the corresponding SSB belongs).

The UE 1221 receiving the PDCCH order in the step S1216 may perform a CFRA procedure based on the SSB indicated by the PDCCH order. If the received preamble index indicate a preamble for CBRA, a CBRA procedure may be performed.

In FIG. 12B, it is assumed that the selected beam and/or TRP is the third TRP.

In a step S1218, the UE 1221 may start a RACH procedure by transmitting a preamble (Msg1) to the third TRP 1213.

The third TRP 1213 may receive the preamble based on the CFRA scheme in a step S1218. The third TRP 1213, which receives the preamble from the UE 1221 in the step S1218, needs to know in advance that the corresponding preamble is a preamble reserved by the PDCCH order. Therefore, the third TRP 1213 may be configured in advance to decode the preamble transmitted by the UE 1221.

If the third TRP 1213 receives the preamble based on the CFRA scheme in the step S1218, the third TRP 1213 may transmit a response message (Msg2) to the UE 1221 in a step S1220. The response message may include a TA value. It should be noted that FIG. 12B does not illustrate a case where the random access preamble collides with a preamble of another UE based on the CBRA scheme. However, based on the present disclosure, if the random access preamble collides in the CBRA scheme, the UE 1221 may perform a random access procedure again. When the UE 1221 receives the second message (Msg2) (including the TA value) from the third TRP 1213, the procedure according to the PDCCH order may be completed. Accordingly, the UE 1221 may obtain the TA value based on the second message.

In addition, if the TA subfield within the PDCCH order execution result report subfield in the reporting options of the SSB search options described above is enabled, the UE 1221 may report the TA value obtained in the step S1222 to the BS through the first TRP 1211. In other words, the TA value may or may not be reported to the first BS through the first TRP 1211 based on the reporting option of the SSB search request message received in the step S1208.

In addition, the TRPS 1211, 1212, 1213, and 1214 and the UE 1221 illustrated in FIGS. 12A and 12B may have the same components as the components previously described in FIG. 2 or may include at least some of the components.

Figure 13:
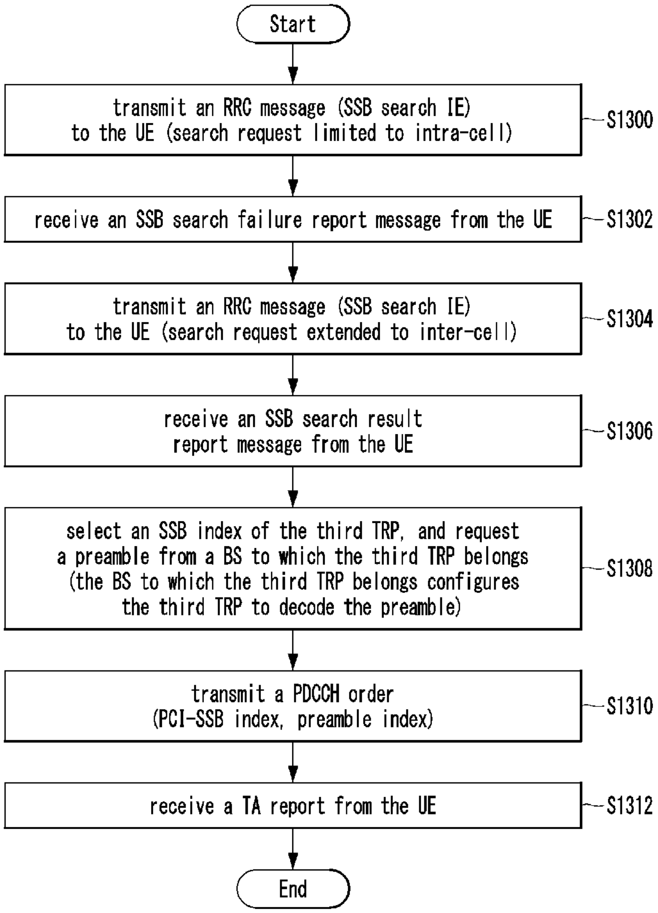
FIG. 13 is a flowchart according to an exemplary embodiment of an operation of the first BS based on an additional TRP or additional beam selection procedure.

FIG. 13 is a flowchart according to an exemplary embodiment of an operation of the first BS based on an additional TRP or additional beam selection procedure.

FIG. 13 may be an operation flowchart of the first BS corresponding to FIGS. 12A and 12B described above. Hereinafter, an operation of the first BS will be described.

In a step S1300, the first BS may transmit an RRC message to allocate an additional TRP or additional beam to the UE. The RRC message may include an SSB search IE. The SSB search IE may include the SSB search options and/or reporting options described in FIG. 10. In this case, the SSB search IE included in the RRC message may be a search request limited to an intra-cell. In other words, it may be indicated to perform SSB search only for TRPs belonging to the first BS. As described above, this indication may request search only for the PCI of the first BS. In addition, the example of FIG. 13 illustrates the RRC message as an example, but as mentioned above, the SSB search IE may be transmitted through a MAC CE or DCI. The step S1300 may correspond to the step S1200 previously described in FIG. 12A.

In a step S1302, the first BS may receive an SSB search failure report message from the UE. The step S1302 may correspond to the step S1206 previously described in FIG. 12A.

In a step S1304, the first BS may determine to add a BS and transmit an RRC message to the UE again. In this case, the retransmitted RRC message may include an SSB search IE. The SSB search IE may include information indicating to search another BS and add the another BS. The step S1304 may correspond to the step S1208 previously described in FIG. 12A.

In a step S1306, the first BS may receive an SSB search result report message from the UE. The SSB search result report message may include a result of searching for SSB(s) transmitted by TRP(s) belonging to at least one BS adjacent to the first BS. In this case, the SSB search result report message may be configured based on the reporting options as described above. For example, information on SSB indexes included in the SSB search result report message may be sorted in order of greater or lesser received signal strengths. The step S1306 may correspond to the step S1214 previously described in FIG. 12B.

In a step S1308, it may be assumed that the first BS selects the third TRP. This may correspond to a case based on what has been previously described in FIG. 12B. When selecting a specific TRP, the first BS may select one of the SSB indexes indicated by the SSB search result report message, and select a TRP with the greatest received signal strength. The first BS may request a preamble from a BS to which the third TRP belongs. Based thereon, the BS to which the third TRP belongs may reserve a preamble for the first BS to the third TRP and configure the third TRP to decode the preamble. It should be noted that the step S1308 is not previously illustrated in FIG. 12B.

In a step S1310, the first BS may transmit to the UE a PDCCH order including a PCI, SSB index, and preamble index of the BS to which the third TRP belongs. The step S1310 may correspond to the step S1216 previously described in FIG. 12B.

In a step S1312, the first BS may receive a report message including a TA value from the UE. The step S1312 may be determined based on information included in the reporting option of the SSB search option, as described above. The step S1312 may correspond to the step S1222 previously described in FIG. 12B.

In the above description, only TA selection has been described without considering TAG. Hereinafter, TA selection considering TAG will be described.

Figure 14:
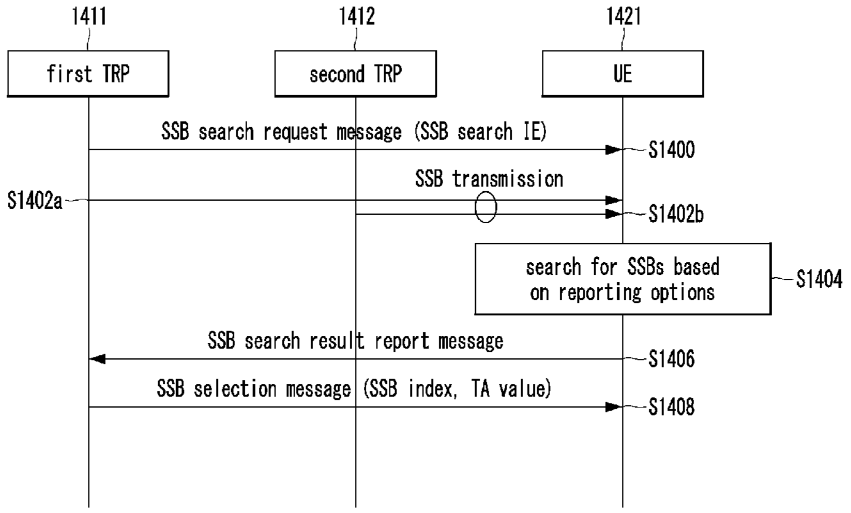
FIG. 14 is a sequence chart illustrating an exemplary embodiment of a case where a selected SSB belongs to the same TAG when a BS wants to serve a UE with multiple beams.

FIG. 14 is a sequence chart illustrating an exemplary embodiment of a case where a selected SSB belongs to the same TAG when a BS wants to serve a UE with multiple beams.

In FIG. 14, it is assumed that a first TRP 1411 and a second TRP 1412 are TRPs belonging to a BS (not shown in FIG. 14). In other words, it is assumed that the first TRP 1411 and the second TRP 1412 are connected below the BS. In addition, it is assumed that a UE 1421 is in an RRC connected state with the BS through the first TRP 1411.

The BS may indicate the first TRP 1411 to transmit an SSB search request message to the UE 1421 through RRC signaling. Accordingly, in a step S1400, the first TRP 1411 may transmit an SSB search request message to the UE 1421. Accordingly, in the step S1400, the UE 1421 may receive the SSB search request message from the first TRP 1411. In the exemplary embodiment of FIG. 14, the case where the BS transmits the SSB search request message to the UE 1421 through the first TPR 1411 by using an RRC message has been described. However, the SSB search request message may be transmitted using a MAC CE or DCI message. The SSB search request message may include an SSB search IE as previously described in FIG. 10.

The first TRP 1411 and the second TRP 1421 may transmit SSBs based on an SSB transmission periodicity. In FIG. 14, a step in which the first TRP 1411 transmits SSBs is illustrated as a step S1402*a*, and a step in which the second TRP 1412 transmits SSBs is illustrated as a step S1402*b*. Accordingly, the UE 1421 may receive SSB(s) from the first TRP 1411 and the second TRP 1412 in the steps S1402*a* and S1402*b*. Ina step S1404, the UE 1421 may perform SSB search based on reporting options indicated by the SSB search request message received in the step S1400. The searching for SSBs may be a procedure in which the UE 1421 receives SSB(s) transmitted through a plurality of beams and searches for SSB(s) whose received signal strength is equal to or greater than a predetermined threshold.

The UE 1421 may generate an SSB search result report message based on a result of the SSB search in the step S1404. In this case, the SSB search result report message may be generated based on the reporting options in the SSB search options described above. In a step S1406, the UE 1421 may transmit the SSB search result report message to the first TRP 1411. Accordingly, the BS may receive the SSB search result report message through the first TRP 1411.

The BS may select an additional beam and/or additional TRP to serve the UE 1421 based on the SSB search result report message transmitted by the UE 1421. The BS' selection of an additional beam and/or additional TRP may result in selecting one SSB. Therefore, the BS that selects one SSB may transmit an SSB selection message to the UE 1421 through the first TRP 1411 in a step S1408. The SSB selection message may include an SSB index and TA value.

The step S1408 is different from what has been described in FIGS. 10 to 13 in that the BS transmits the SSB selection message rather than a PDCCH order to the UE 1421. Based on FIGS. 10 to 13 described above, the BS transmits a PDCCH order to the UE 1421, so that the UE 1421 starts a RACH procedure with the corresponding TRP.

However, according to the present exemplary embodiment, the BS may transmit the SSB selection message to the UE 1421 in the step S1408, so that the UE 1421 applies the TA value, which is applied during uplink transmission to the first TRP 1411, equally to the second TRP 1412 without a RACH procedure. This case may correspond to a case where the SSB selected by the BS belongs to the same TAG as the SSB currently connected. Accordingly, the BS may transmit the SSB selection message including the SSB index of the selected SSB or including the SSB index and the TA value to the UE 1421. In this case, the SSB selection message may be transmitted using an RRC message, MAC CE, DCI message, and/or the like.

When the BS transmits the SSB selection message including only the SSB index to the UE 1421, the UE 1421 may implicitly recognize that the selected beam belongs to the same TAG as the first connected beam. Therefore, when the UE 1421 receives the SSB selection message including only the SSB index, the UE 1421 may apply the same TA value as the first TRP 1411 when transmitting uplink data to the second TRP 1412.

As another example, the BS may transmit to the UE 1421 the SSB selection message including the selected SSB index and further including the same TA value and/or TAG identifier (ID) as the beam connected to the first TRP 1411. In this case, the UE 1421 may have information on the TAG in advance.

As another example, the SSB selection message including the selected SSB index and a field explicitly indicating whether the selected SSB belongs to the same TAG as the beam connected to the first TRP 1411 may be transmitted to the UE 1421.

In addition, the TRPs 1411 and 1412 and the UE 1421 illustrated in FIG. 14 may have the same components as the components previously described in FIG. 2 or may include at least some of the components.

Figure 15:
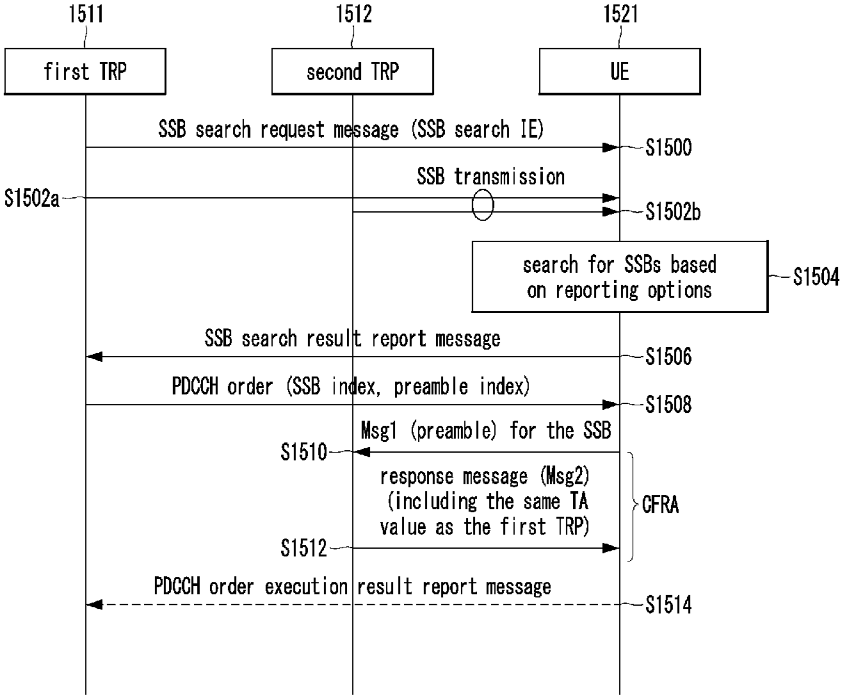
FIG. 15 is a sequence chart illustrating another exemplary embodiment for a case where a selected SSB belongs to the same TAG when a BS wants to serve a UE with multiple beams.

FIG. 15 is a sequence chart illustrating another exemplary embodiment for a case where a selected SSB belongs to the same TAG when a BS wants to serve a UE with multiple beams.

In FIG. 15, it is assumed that a first TRP 1511 and a second TRP 1512 are TRPs belonging to a BS (not shown in FIG. 15). Additionally, it is assumed that a UE 1521 is in an RRC connected state with the BS through the first TRP 1511.

The BS may indicate the first TRP 1511 to transmit an SSB search request message to the UE 1521 through RRC signaling. Accordingly, in a step S1500, the first TRP 1511 may transmit an SSB search request message to the UE 1521. Accordingly, in the step S1500, the UE 1521 may receive the SSB search request message from the first TRP 1511. In the exemplary embodiment of FIG. 15, the case where the BS transmits the SSB search request message to the UE 1521 through the first TPR 1511 by using an RRC message has been described. However, the SSB search request message may be transmitted using a MAC CE or DCI message. The SSB search request message may include an SSB search IE as previously described in FIG. 10.

The first TRP 1511 and second TRP 1512 may transmit SSBs based on an SSB transmission periodicity. In FIG. 15, a step in which the first TRP 1511 transmits SSBs is illustrated as a step S1502*a*, and a step in which the second TRP 1512 transmits SSBs is illustrated as a step S1502*b*. Accordingly, the UE 1521 may receive SSB(s) from the first TRP 1511 and the second TRP 1512 in the steps S1502*a* and S1502*b*. Ina step S1504, the UE 1521 may perform SSB search based on reporting options indicated by the SSB search request message received in the step S1500. The searching for SSBs may be a procedure in which the UE 1521 receives SSB(s) transmitted through a plurality of beams and searches for SSB(s) whose received signal strength is equal to or greater than a predetermined threshold.

The UE 1521 may generate an SSB search result report message based on a result of the SSB search in the step S1504. In this case, the SSB search result report message may be generated based on the reporting options in the SSB search options described above. In a step S1506, the UE 1521 may transmit the SSB search result report message to the first TRP 1511. Accordingly, the BS may receive the SSB search result report message through the first TRP 1511.

The BS may select an additional beam and/or additional TRP to serve the UE 1521 based on the SSB search result report message transmitted by the UE 1521. The BS' selection of an additional beam and/or additional TRP may result in selecting one SSB. Therefore, the BS that selects one SSB may transmit a PDCCH order to the UE 1521 through the first TRP 1511 in a step S1508. The PDCCH order transmitted in the step S1508 may include an SSB index selected by the BS and a reserved preamble index, as described above.

In a step S1515, the UE 1521 may transmit a preamble (Msg1) to the second TRP 1512. If the second TRP 1512 receives the preamble based on the CFRA scheme in the step S1515, the second TRP 1512 may transmit a response message (Msg2) to the UE 1521 in a step S1512. It should be noted that FIG. 15 does not illustrate a case where the random access preamble collides with another UE based on the CBRA scheme. However, according to the present disclosure, if the random access preamble collides in the CBRA scheme, the UE 1521 may perform a random access procedure again.

Meanwhile, the BS or the second TRP 1512 may transmit the response message (Msg2) including the same TA value as the first TRP 1511 to the UE 1521. Accordingly, the UE 1521 may recognize that the TA value included in the response message is the same as the first TRP 1511. Therefore, the UE 1521 may recognize that TA values of a first serving beam (i.e. beam of the first TRP 1511) and a second serving beam (i.e. beam of the second TRP 1512) are the same, and determine that the beam of the first TRP 1511 and the beam of the TRP 1512 belong to the same TAG.

In addition, if the TA subfield in the PDCCH execution result report option in the reporting options of the SSB search options described above is enabled, the UE 1521 may report the TA value obtained in the step S1514 to the BS through the first TRP 1511.

The exemplary embodiments of FIGS. 14 and 15 will be compared and described.

First, the case of FIG. 14 has an advantage of not performing a RACH procedure. However, because a RACH procedure is omitted, the UE may need to perform an operation of acquiring frequency and time synchronization with the SSB of the second TRP in the SSB search step (i.e. steps 1402*a*, 1402*b*, and 1404). However, in the SSB search step, the UE does not know which beam will be selected. Therefore, the UE may need to store frequency and time synchronizations with all SSBs in order to acquire frequency and time synchronization with the selected SSB. This may cause a problem that increases complexity of the UE.

On the other hand, since in case of FIG. 15, a RACH procedure is performed in the conventional manner, frequency and time synchronization only needs to be acquired with the selected SSB of the second TRP. However, even the case of FIG. 15 may cause waste of resources, such as performing a separate RACH procedure once and transmitting a report message therefor.

In addition, the TRPs 1511 and 1512 and the UE 1521 illustrated in FIG. 15 may have the same components as the components previously described in FIG. 2 or may include at least some of the components.

Figure 16A:
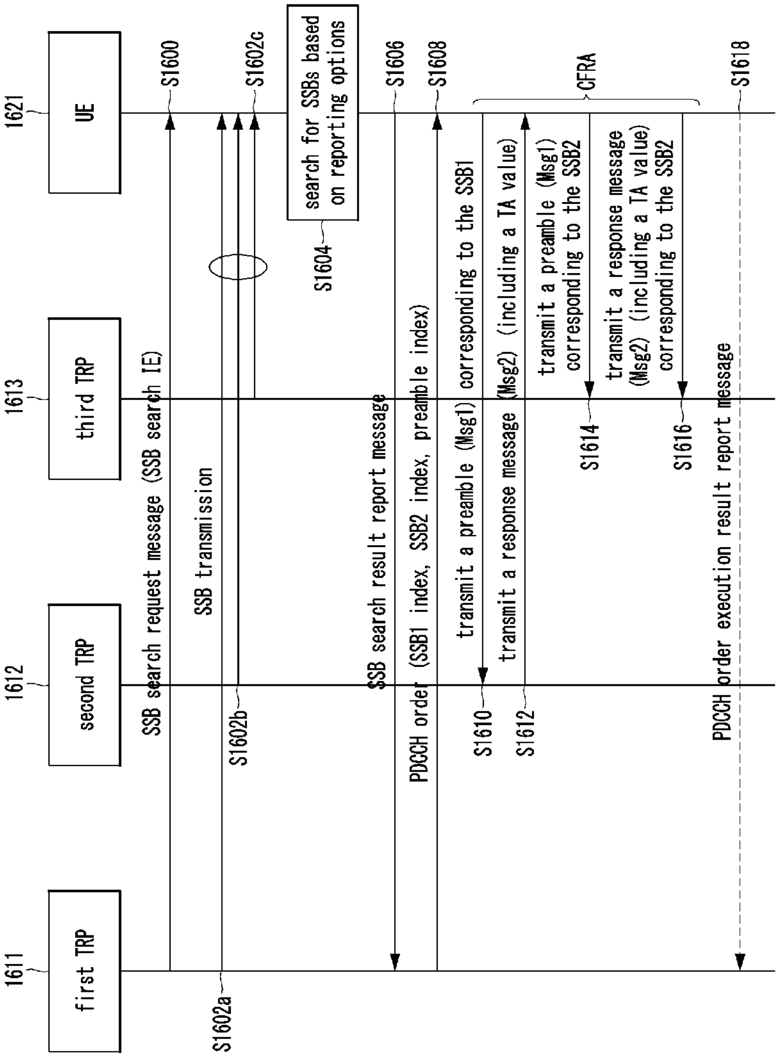
FIG. 16A is a sequence chart illustrating an exemplary embodiment for a case where a UE receives services through beams from three different TRPs.

FIG. 16A is a sequence chart illustrating an exemplary embodiment for a case where a UE receives services through beams from three different TRPs.

In FIG. 16A, it is assumed that a first TRP 1611, second TRP 1612, and third TRP 1613 are TRPs belonging to a BS (not shown in FIG. 16). In other words, it is assumed that the first TRP 1611, second TRP 1612, and third TRP 1613 are connected below the BS. Additionally, it is assumed that the UE 1621 is in an RRC connected state with the BS through the first TRP 1611.

The BS may indicate the first TRP 1611 to transmit an SSB search request message to the UE 1621 through RRC signaling. Accordingly, in a step S1600, the first TRP 1611 may transmit an SSB search request message to the UE 1621. Accordingly, in the step S1600, the UE 1621 may receive the SSB search request message from the first TRP 1611. In the exemplary embodiment of FIG. 16A, the case where the BS transmits the SSB search request message to the UE 1621 through the first TPR 1611 by using an RRC message has been described. However, the SSB search request message may be transmitted using a MAC CE or DCI message. The SSB search request message may include an SSB search IE as previously described in FIG. 10.

The first TRP 1611, second TRP 1612, and third TRP 1613 may transmit SSBs based on an SSB transmission periodicity. In FIG. 16A, a step in which the first TRP 1611 transmits SSBs is illustrated as a step S1602*a*, a step in which the second TRP 1612 transmits SSBs is illustrated as a step S1602*b*, and a step in which the third TRP 1613 transmits SSBs is illustrated as a step S1602*c*. Accordingly, the UE 1621 may receive SSB(s) from the first TRP 1611, second TRP 1612, and third TRP 1613 in the steps S1602*a* to S1602*c*. In a step S1604, the UE 1621 may perform SSB search based on reporting options indicated by the SSB search request message received in the step S1600. The searching for SSBs may be a procedure in which the UE 1621 receives SSB(s) transmitted through a plurality of beams and searches for SSB(s) whose received signal strength is equal to or greater than a predetermined threshold.

The UE 1621 may generate an SSB search result report message based on a result of the SSB search in the step S1604. In this case, the SSB search result report message may be generated based on the reporting options in the SSB search options as described in FIG. 10. In a step S1606, the UE 1621 may transmit the SSB search result report message to the first TRP 1611. Accordingly, the BS may receive the SSB search result report message through the first TRP 1611. In this case, the SSB search result report message may include information on an SSB1 of the second TRP 1612 and information on an SSB2 of the third TRP 1613.

The BS may select an additional beam(s) and/or additional TRP(s) to serve the UE 1621 based on the SSB search result report message transmitted by the UE 1621. In FIG. 16A, differently from what has been described above, the BS may select two different SSBs. Therefore, the BS that selects two different SSBs may transmit a PDCCH order to the UE 1621 through the first TRP 1611 in a step S1608. The PDCCH order may include two selected SSB indexes (i.e. SSB1 index and SSB2 index) and may include a preamble index. In order to execute the PDCCH order for multiple SSBs, the existing PDCCH order may need to be modified to include multiple SSB indexes. However, when the multiple SSBs belong to the same cell, only one preamble may be used in common. This is because RACH procedures based on the SSBs, which are requested by the PDCCH order, do not occur at the same time, and beam directions therefor are different. If the SSBs indicated by the PDCCH order belong to different cells, different preamble indexes applicable to the respective cells need to be included in the PDCCH order.

As described above, it is assumed that the SSB1 is an SSB corresponding to a beam of the second TRP 1612 and the SSB2 is an SSB corresponding to a beam of the third TRP 1613. Therefore, the UE 1621 may transmit a preamble (Msg1) to the second TRP 1612 in a step S1610. When the second TRP 1612 receives the preamble in the step S1610, the second TRP 1612 may transmit a response message (Msg2) to the UE 1621 in step a S1612. In this case, the response message may include a TA value.

Additionally, the UE 1621 may transmit a preamble (Msg1) to the third TRP 1613 in a step S1614. When the third TRP 1613 receives the preamble in the step S1614, the third TRP 1613 may transmit a response message (Msg2) to the UE 1621 in step a S1616. In this case, the response message may include a TA value.

As described above, the UE 1621 may perform the RACH procedure with the second TRP 1612 and the RACH procedure with the third TRP 1613. Accordingly, the UE 1621 may be connected to three TRPs, including the first TRP 1611 to which it is initially connected, as well as the second TRP 1612 and the third TRP 1613. Although FIG. 16A illustrates the case where the RACH procedures are performed based on the CFRA scheme, it is obvious to those skilled in the art that the CBRA scheme is also applicable.

In addition, if the TA subfield value in the PDCCH order execution result report option in the reporting options of the SSB search options described above is enabled, the UE 1621 may report the TA value obtained in the step S1618 to the BS through the first TRP 1611.

In addition, the TRPs 1611, 1612, and 1613 and the UE 1621 illustrated in FIG. 16A may have the same components as the components previously described in FIG. 2 or may include at least some of the components.

Figure 16B:
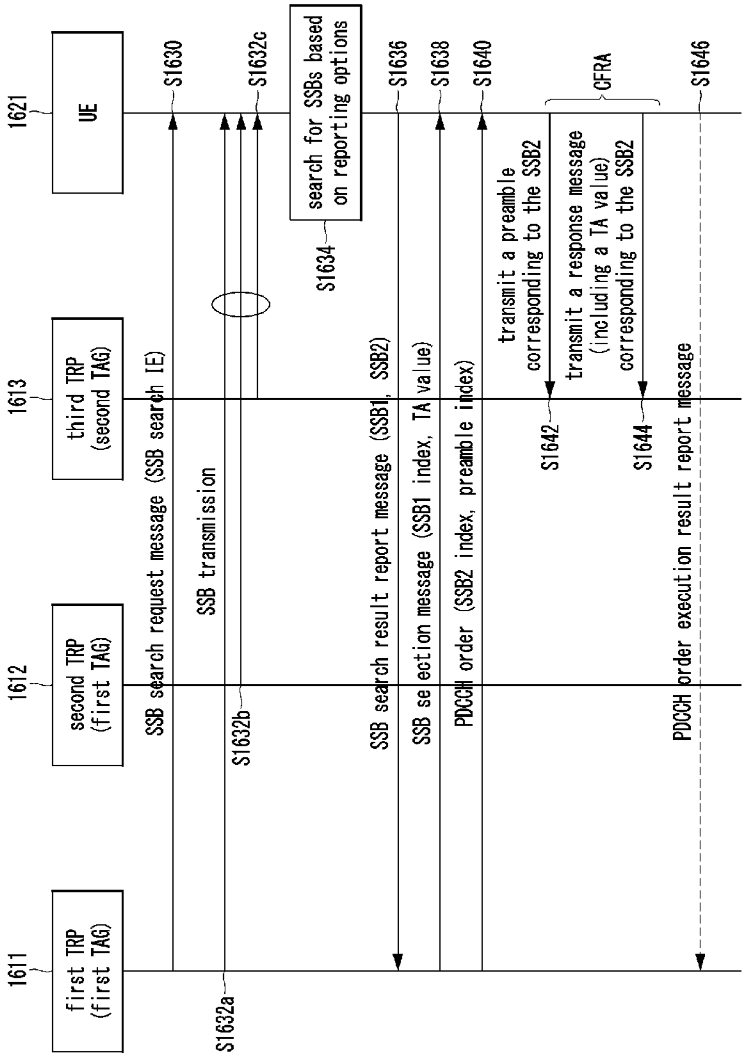
FIG. 16B is a sequence chart illustrating another exemplary embodiment for a case where a UE receives services through beams from three different TRPs.

FIG. 16B is a sequence chart illustrating another exemplary embodiment for a case where a UE receives services through beams from three different TRPs.

In FIG. 16B, it is assumed that the first TRP 1611, second TRP 1612, and third TRP 1613 are TRPs belonging to a BS (not shown in FIG. 16). In other words, it is assumed that the first TRP 1611, second TRP 1612, and third TRP 1613 are connected to the BS. Additionally, it is assumed that the first TRP 1611 and the second TRP 1612 belong to a first TAG, and the third TRP 1613 belongs to a second TAG. Additionally, it is assumed that the UE 1621 is in an RRC connected state with the BS through the first TRP 1611.

The BS may indicate the first TRP 1611 to transmit an SSB search request message to the UE 1621 through RRC signaling. Accordingly, in a step S1630, the first TRP 1611 may transmit an SSB search request message to the UE 1621. Accordingly, in the step S1630, the UE 1621 may receive the SSB search request message from the first TRP 1611. In the exemplary embodiment of FIG. 16B, the case where the BS transmits the SSB search request message to the UE 1621 through the first TPR 1611 by using an RRC message has been described. However, the SSB search request message may be transmitted using a MAC CE or DCI message. The SSB search request message may include an SSB search IE as previously described in FIG. 10.

The first TRP 1611, second TRP 1612, and third TRP 1613 may transmit SSBs based on an SSB transmission periodicity. In FIG. 16B, a step in which the first TRP 1611 transmits SSBs is illustrated as a step S1632*a*, a step in which the second TRP 1612 transmits SSBs is illustrated as a step S1632*b*, and a step in which the third TRP 1613 transmits SSBs is illustrated as a step S1632*c*. Accordingly, the UE 1621 may receive SSB(s) from the first TRP 1611, second TRP 1612, and third TRP 1613 in the steps S1632*a* to S1632*c*. In a step S1634, the UE 1621 may perform SSB search based on reporting options indicated by the SSB search request message received in the step S1630. The searching for SSBs may be a procedure in which the UE 1621 receives SSB(s) transmitted through a plurality of beams and searches for SSB(s) whose received signal strength is equal to or greater than a predetermined threshold.

The UE 1621 may generate an SSB search result report message based on a result of the SSB search in the step S1634. In this case, the SSB search result report message may be generated based on the reporting options in the SSB search options described in FIG. 10. In a step S1636, the UE 1621 may transmit the SSB search result report message to the first TRP 1611. Accordingly, the BS may receive the SSB search result report message through the first TRP 1611. In this case, the SSB search result report message may include information on the SSB1 of the second TRP 1612 and information the an SSB2 of the third TRP 1613.

The BS may select an additional beam and/or additional TRP to serve the UE 1621 based on the SSB search result report message transmitted by the UE 1621. FIG. 16B also illustrates the case where the BS selects two different SSBs, as previously described in FIG. 16A. However, the BS according to the exemplary embodiment of FIG. 16B may transmit an SSB selection message and a PDCCH order to the UE 1621 based on TAGs.

In a step S1638, the BS may first transmit an SSB selection message to the UE 1621 through the first TRP 1611. The BS transmits the SSB selection message to the UE 1621 through the first TRP 1611 because the second TRP 1612 belongs to the same TAG as the first TRP 1611. Accordingly, the SSB selection message may include an SSB1 index and a TA value as described in FIG. 14. As another example, the SSB selection message may include an SSB index and a TAG ID. As another example, if the BS includes only the SSB index in the SSB selection message, the UE may implicitly recognize that the selected beam belongs to the same TAG as the first TRP 1611. Therefore, in this case, the UE 1621 may apply the same TA value when transmitting uplink data to the second TRP 1612.

The UE 1621 receiving the SSB selection message in the step S1638 may set a TA value for the second TRP 1612 to be the same as that of the first TRP 1611 based on the information (or parameters) included in the SSB selection message.

In a step S1640, the BS may transmit a PDCCH order to the UE 1621 through the first TRP 1611. The PDCCH order may include an SSB2 index and a preamble index. The BS transmits the PDCCH order to the UE 1621 through the first TRP 1611 because the first TRP 1611 and the third TRP 1613 belong to different TAGs.

The UE 1621 receiving the PDCCH order in the step S1640 may transmit a preamble to the third TRP 1613 based on the information (or parameters) included in the PDCCH order in the step S1642. In other words, in the step S1642, the UE 1621 may transmit a preamble corresponding to the SSB2 to the third TRP 1613.

In a step S1644, the third TRP 1613 may transmit a response message to the UE 1611. In this case, the response message may include a TA value.

In a step S1646, the UE 1621 may include the acquired TA value in a PDCCH execution result report message and report it to the BS through the first TRP 1611. The PDCCH order execution result report message may be transmitted when the TA subfield value in the PDCCH order execution report option in the reporting options of the SSB search options described above is enabled.

Since the second TRP 1612 and the first TRP 1611 described in FIG. 16B belong to the same TAG, the procedure can be simplified by using the same TA value without a separate RACH procedure. However, as previously described in FIG. 14, there may be complexity in that the UE needs to synchronize frequency and time with candidate SSBs and store them when performing the SSB search.

In addition, the TRPs 1611, 1612, and 1613 and the UE 1621 illustrated in FIG. 16B may have the same components as the components previously described in FIG. 2 or may include at least some of the components.

Figure 17:
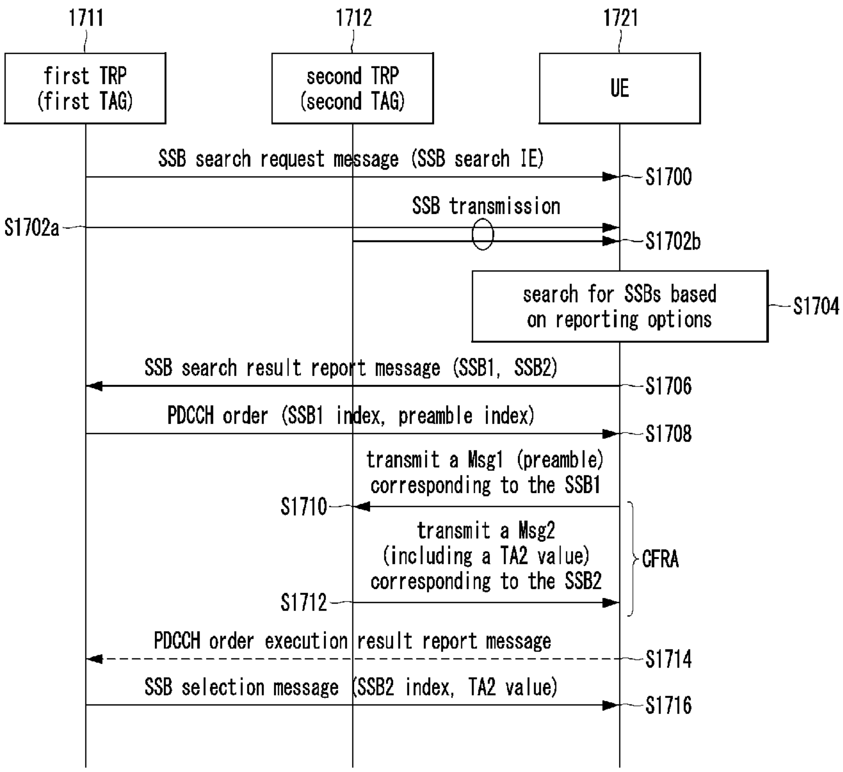
FIG. 17 is a sequence chart illustrating an exemplary embodiment for a case where a UE receives services through three different beams from two different TRPs.

FIG. 17 is a sequence chart illustrating an exemplary embodiment for a case where a UE receives services through three different beams from two different TRPs.

In FIG. 17, it is assumed that a first TRP 1711 and a second TRP 1712 are TRPs belonging to a BS (not shown in FIG. 17). In other words, it is assumed that the first TRP 1711 and the second TRP 1712 are connected below the BS. In addition, it is assumed that a beam through which the UE 1721 receives services through the first TRP 1711 belongs to a first TAG, and a beam for an SSB1 and a beam from an SSB2, through which the UE 1721 receives through the second TRP 1712, belong to a second TAG. Additionally, it is assumed that the UE 1721 is in an RRC connected state with the BS through the first TRP 1711.

The BS may indicate the first TRP 1711 to transmit an SSB search request message to the UE 1721 through RRC signaling. Accordingly, in a step S1700, the first TRP 1711 may transmit an SSB search request message to the UE 1721. Accordingly, in the step S1700, the UE 1721 may receive the SSB search request message from the first TRP 1711. In the exemplary embodiment of FIG. 17, the case where the BS transmits the SSB search request message to the UE 1721 through the first TPR 1711 by using an RRC message has been described. However, the SSB search request message may be transmitted using a MAC CE or DCI message. The SSB search request message may include an SSB search IE as previously described in FIG. 10.

The first TRP 1711 and second TRP 1712 may transmit SSBs based on an SSB transmission periodicity. In FIG. 17, a step in which the first TRP 1711 transmits SSBs is illustrated as a step S1702*a*, and a step in which the second TRP 1712 transmits SSBs is illustrated as a step S1702*b*. Accordingly, the UE 1721 may receive SSB(s) from the first TRP 1711 and second TRP 1712 in the steps S1702*a* to S702*b*. In a step S1704, the UE 1721 may perform SSB search based on reporting options indicated by the SSB search request message received in the step S1700. The searching for SSBs may be a procedure in which the UE 1721 receives SSB(s) transmitted through a plurality of beams and searches for SSB(s) whose received signal strength is equal to or greater than a predetermined threshold.

The UE 1721 may generate an SSB search result report message based on a result of the SSB search in the step S1704. In this case, the SSB search result report message may be generated based on the reporting options in the SSB search options described above. In a step S1706, the UE 1621 may transmit the SSB search result report message to the first TRP 1711. FIG. 17 illustrates a case where the SSB search result report message includes information on the SSB1 and SSB2. Here, it is assumed that both the SSB1 and SSB2 are SSBs corresponding to beams of the second TRP 1712. Accordingly, the BS may receive the SSB search result report message through the first TRP 1711.

The BS may select an additional beam and/or additional TRP to serve the UE 1721 based on the SSB search result report message transmitted by the UE 1721. The BS's selection of an additional beam and/or additional TRP may result in selecting SSB(s). In a step S1708, the BS may transmit a PDCCH order based on the information on the SSB1 to the UE 1721 through the first TRP 1711. Here, the PDCCH order based on the information on the SSB1 may be intended to indicate to perform a RACH procedure performed through the beam corresponding to the SSB1. Therefore, the PDCCH order based on the information on the SSB1 may include an index of the SSB1 and a preamble index.

In a step S1708, the BS transmits the PDCCH order to the UE 1721 through the first TRP 1711 based only on the information on the SSB1 to prevent resource waste. As described above, it is assumed that both the SSB1 and SSB2 correspond to beams received from the second TRP 1712 and belong to the same TAG. Therefore, it may be a waste of resources for the BS to request a PDCCH order for both the SSBs belonging to the same TAG, so it may request TA acquisition for only one SSB.

The UE 1721 receiving the PDCCH order in the step S1708 may perform a CFRA procedure using the index of the SSB 1 and the preamble index included in the PDCCH order. In other words, the UE 1721 may transmit a preamble to the second TRP 1712 in a step S1710. The second TRP 1712 may transmit a response message (Msg2) to the UE 1721 in a step S1712 in response to receiving the preamble. The response message transmitted in the step S1712 may include a TA2 value. Here, since the first TRP 1711 belongs to the first TAG and the second TRP 1712 belongs to the second TAG, a TA value between the first TRP 1711 and UE 1721 is referred to as 'TA1 value', and a TA value between the second TRP 1712 and the UE is referred to as 'TA2 value'. Therefore, the UE 1721 may obtain the TA2 value based on the response message received in the step S1712.

In a step S1714, the UE 1721 may report the acquired TA value by including it in a PDCCH order execution result report message and report it to the BS through the first TRP 1711. The PDCCH order execution result report message may be transmitted when the TA subfield in the PDCCH order execution result report option in the reporting options of the SSB search options described above is enabled.

The BS receiving the PDCCH order execution result report message from the UE 1721 in the step S1714 may recognize that the RACH procedure for the SSB1 has been completed. Therefore, the BS may transmit an SSB selection message to the UE 1721 in a step S1716 in order to provide the UE 1721 with services based on the SSB2, which corresponds to another beam of the second TRP 1712. Here, the BS transmits the SSB selection message rather than a PDCCH order to the UE 1721 because the beams of the second TRP 1712 belong to the second TAG. In other words, the RACH procedure corresponding to the SSB1 has been performed between the second TRP 1712 and the UE 1721, and the SSB2 belongs to the same TAG as the SSB1, so the BS may transmit the SSB selection message rather than a PDCCH order.

The SSB selection message transmitted in the step S1716 may include an index of the SSB2 and the TA2 value. The SSB selection message may use one of an RRC message, MAC CE, or DCI. The SSB selection message may include the SSB2 index or the SSB2 index and the TA value for the SSB1 with respect to the UE. Additionally, according to the present disclosure, the SSB selection message may further include a TAG ID in addition to the information described above. If the TAG ID is included, the UE 1721 may have information on the TAG in advance. Therefore, the UE 1721 may perform uplink transmission by applying the same TA value for the SSB2 as the SSB1 based on the SSB selection message.

In addition, the TRPs 1711 and 1712 and the UE 1721 illustrated in FIG. 17 may have the same components as the components previously described in FIG. 2 or may include at least some of the components.

Figure 18:
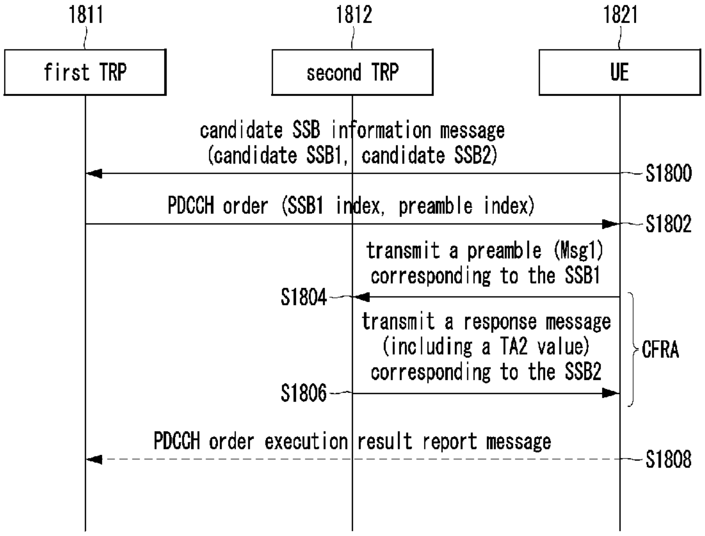
FIG. 18 is a sequence chart illustrating another exemplary embodiment of TRP and beam selection when a UE transmits information on candidate SSB(s) measured during cell search to a BS.

FIG. 18 is a sequence chart illustrating another exemplary embodiment of TRP and beam selection when a UE transmits information on candidate SSB(s) measured during cell search to a BS.

In FIG. 18, it is assumed that a first TRP 1811 and a second TRP 1812 are TRPs belonging to a BS (not shown in FIG. 18). In other words, it is assumed that the first TRP 1811 and the second TRP 1812 are connected below the BS. Additionally, it is assumed that the UE 1821 stores information on candidate SSB(s) in advance during cell search. In other words, the UE 1821 may have stored a predetermined number of beams sorted in descending order starting from the best beam when performing cell search in order to connect to the BS through the first TRP 1811. Here, the best beam may be a beam determined based on a received signal strength among the received SSBs whose received signal strength is equal to or greater than a predetermined threshold. For example, the best beam may be a beam corresponding to an SSB with the greatest received signal strength among the received SSBs whose received signal strength is equal to or greater than the predetermined threshold, and the second best beam may be a beam corresponding to an SSB whose received signal strength is the second greatest received signal strength among the received SSBs whose received signal strength is equal to or greater than the predetermined threshold.

In this case, it is assumed that the best beam is a beam from the first TRP 1811, and the second and third best beams are beams from the second TRP 1812. Therefore, the UE 1821 may perform a RACH procedure to the BS through the first TRP 1811 with the best beam. Based thereon, the UE 1821 may transition to an RRC connected state with the BS through the first TRP 1811. Therefore, the UE 1821 may have received a TA1 value from the first TRP 1811.

In a step S1800, the UE 1821 may transmit a candidate SSB information message to the BS through the first TRP 1811. The candidate SSB(s) may be the SSBs (SSB1 and SSB2) of the second and third best beams pre-stored during cell search under the assumption described above. Therefore, the candidate SSB information message may include information on the candidate SSB1 and candidate SSB2. The candidate SSB information message may use any one of an RRC message, MAC CE message, and UCI message. Additionally, the candidate SSB information message may include only information on SSB(s) belonging to the currently connected cell (currently connected BS) or may include information on SSB(s) belonging to another cell (another BS).

Meanwhile, although not illustrated in FIG. 18, when the UE 1821 connects to the BS, the BS may transmit a candidate SSB request message to the UE 1821 through the connected first TRP 1811 to identify whether the UE 1821 has information on candidate SSB(s). When the request message is received, the step S1800 may proceed in response thereto. If the UE 1821 receiving the SSB candidate request message does not have candidate SSB(s), the UE 1821 may respond with a message indicating that there is no candidate SSB.

In the step S1800, the BS may receive the candidate SSB information message from the UE 1821. The BS may receive the candidate SSB information message from the UE 1821 and transmit a PDCCH order in a step S1802 if the BS wants to provide services to the UE 1821 through an additional beam. In other words, the BS may transmit a PDCCH order to the UE 1821 without a cell search indication. The PDCCH order may include index(es) of at least one SSB among the candidate SSB(s). In the exemplary embodiment of FIG. 18, a case where an index of the SSB1 is included among the candidate SSBs is illustrated. Additionally, the PDCCH order may include a reserved preamble index as described above. In a step S1802, the UE 1821 may receive the PDCCH order including the SSB1 index and the preamble index.

Steps S1804 and S1806 may be a CFRA procedure as described previously. In other words, this may be a procedure for transmitting a preamble without contention using the reserved preamble index. In the step S1804, the UE 1821 may transmit a preamble corresponding to the preamble index included in the PDCCH order to the second TRP 1812 based on the SSB index included in the received PDCCH order. In the step S1806, the second TRP 1812 may transmit a response message including a TA2 value to the UE 1821 in response to receiving the preamble from the UE 1821. The UE 1821 receiving the response message including the TA2 value from the second TRP 1812 in the step S1806 may store the TA2 value for use in communication with the second TRP 1812.

The UE 1821 may transmit a PDCCH order execution result report message to the BS through the first TRP 1811. The UE 1821 transmits the PDCCH order execution result report message when pre-configured by the BS. In this case, the pre-configuration scheme may be the same as or different from that previously described in FIG. 10. In FIG. 18, information on the SSB search options cannot be received because there is no SSB search request. Therefore, the BS may independently transmit a reporting option message to the UE 1821 in advance. Based thereon, the UE 1821 may transmit the PDCCH order execution result report message to the first TRP 1811 when a PDCCH order execution result report option indicated by the reporting option message is enabled.

Meanwhile, the case of FIG. 18 assumes the case where the candidate SSBs reported by the UE 1821 to the BS in the step S1800 are beams belonging to the second TRP 1812. If the SSBs obtained from the UE 1821 are all beams belonging to the first TRP 1811, the BS may request the UE to search for SSBs for other TRPs within a cell or TRPs of other cells.

When the BS requests the UE 8121 to search for SSB(s) for other TRP(s) within the cell or TRP(s) of other cells, the BS may transmit an SSB search request message to the UE 1821. The SSB search request message may include an SSB search IE. If the UE has previously stored information on SSBs belonging to neighbor cells when storing information on the candidate SSBs in the initial access procedure, the previously stored information may be delivered to the BS without a separate cell search in response to the search request for the SSBs of other cells.

In addition, the TRPs 1812 and 1812 and the UE 1821 illustrated in FIG. 18 may have the same components as the components previously described in FIG. 2 or may include at least some of the components.

Figure 19:
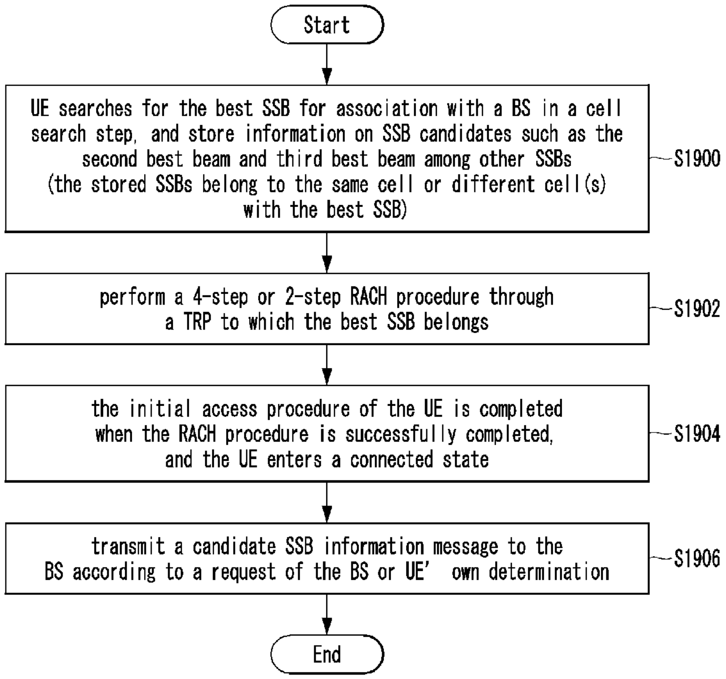
FIG. 19 is a flowchart for a case where a UE measures candidate SSB(s) during cell search and transmits information thereon to a BS.

FIG. 19 is a flowchart for a case where a UE measures candidate SSB(s) during cell search and transmits information thereon to a BS.

In a step S1900, a UE may perform cell search to make association with a BS. In a cell search procedure, the UE may search for multiple SSBs that can be used to connect to the BS. The UE may store a predetermined number of candidate SSBs starting from the best SSB among the SSBs that can be used to connect to the BS. As described in FIG. 18, the UE may sort the SSBs that can be used to connected to the BS in descending order, such as from the best SSB to the second best SSB and third best beam, and store information on the predetermined number of candidate SSBs. Here, the stored SSBs may belong to the same cell (same BS) or different cell(s) (different BS(s)) as the best SSB.

In a step S1902, the UE may perform a 4-step RACH procedure or 2-step RACH procedure through a TRP to which the best SSB belongs. Since the 4-step RACH procedure or 2-step RACH procedure is already specified in the 3GPP technical specifications, further description thereon will be omitted here.

In a step S1904, when the 4-step RACH procedure or 2-step RACH procedure is completed, the UE may be in a connected state with the BS.

In a step S1906, the UE may generate a candidate SSB information message based on a request of the BS or by the UE's own determination (determination based on a preconfigured condition) and transmit the candidate SSB information message to the BS through the TRP connected to the BS.

Figure 20:
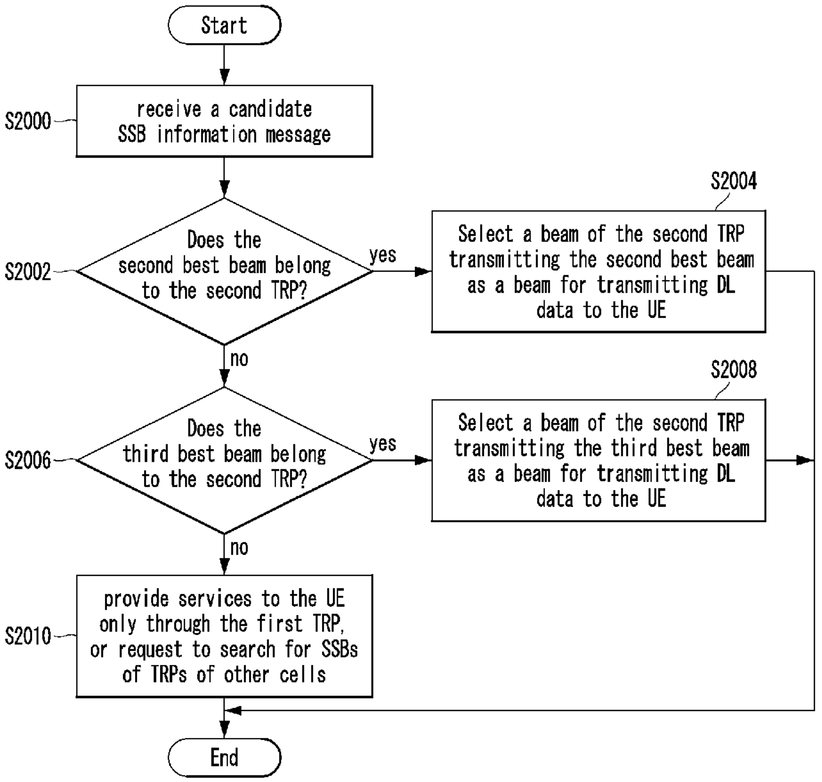
FIG. 20 is a flowchart of an operation of a BS when the BS receives a candidate SSB information message from a UE.

FIG. 20 is a flowchart of an operation of a BS when the BS receives a candidate SSB information message from a UE.

In a step S2000, the BS may receive the candidate SSB information message from the UE. As previously described in FIGS. 18 and 19, the candidate SSB information message may include information on one or more candidate SSBs. If the candidate SSB information message includes information on only one SSB, the only one SSB may correspond to the second best beam for the UE to access the BS. If the candidate SSB information message information on two SSBs, one SSB may correspond to the second best beam for the UE to access the BS, and the other SSB may correspond to the third best beam for the UE to access the BS.

In a step S2002, the BS may check whether the second best beam belongs to the second TRP. The TRP through which the UE is currently connected to the BS may be the first TRP. Therefore, here, the second TRP may mean a TRP other than the TRP through which the UE is currently connected to the BS. As a result of the check in the step S2002, if the second best beam belongs to the second TRP, the BS may proceed to a step S2004, and if the second best beam does not belong to the second TRP, the BS may proceed to a step S2006.

In the step S2004, the BS may select a beam of the second TRP that transmitted the second best beam as a beam for transmitting downlink (DL) data to the UE.

In a step S2006, the BS may check whether the third best beam belongs to the second TRP. If the third best beam belongs to the second TRP as a result of the check in the step S2006, the BS may proceed to a step S2008, and if the third best beam does not belong to the second TRP, the BS may proceed to a step S2010.

In the step S2008, the BS may select a beam of the second TRP that transmitted the third best beam as a beam for transmitting downlink (DL) data to the UE.

The step S2010 may correspond to a case where both the second best beam and the third best beam are beams of the first TRP as a result of the check in the steps S2002 and S2006. Therefore, in the step S2010, the BS may service the UE using only the first TRP.

As another example, since the step S2010 corresponds to the case where both the second best beam and the third best beam are beams of the first TRP, the BS may request to search for SSBs of TRPs of other cells in the step S21010. In this case, the BS may transmit an SSB search request message including an SSB search IE to the UE through the first TRP.

Figure 21:
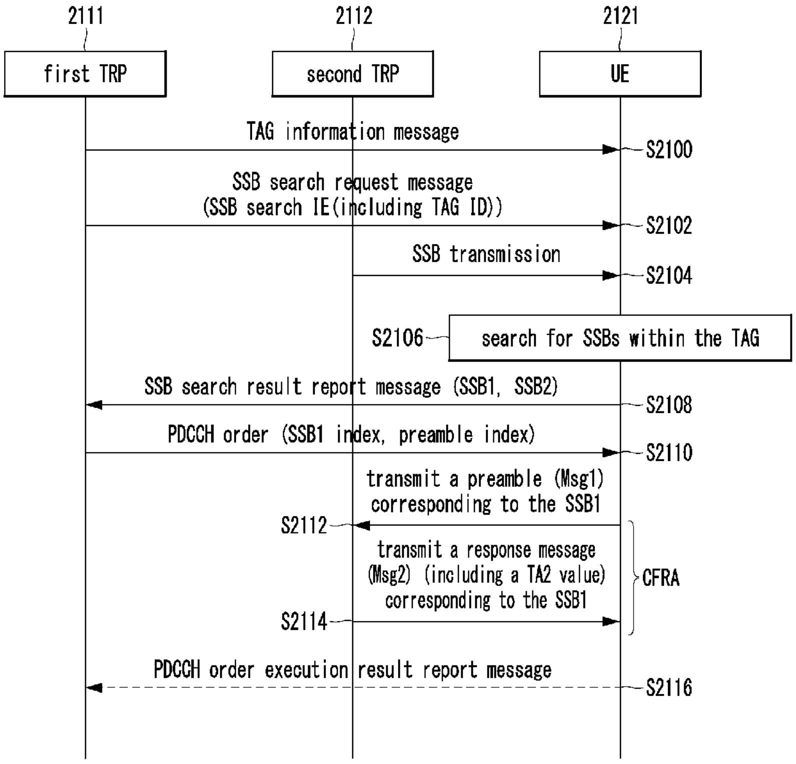
FIG. 21 is a sequence chart according to an embodiment for a case where a BS transmits information on TAG(s) to a UE and the UE uses two beams belonging to different TRPs.

FIG. 21 is a sequence chart according to an embodiment for a case where a BS transmits information on TAG(s) to a UE and the UE uses two beams belonging to different TRPs.

In FIG. 21, it is assumed that a first TRP 2111 and a second TRP 2112 are TRPs belonging to a BS (not shown in FIG. 21). In other words, it is assumed that the first TRP 2111 and the second TRP 2112 are connected below the BS. Additionally, it is assumed that the UE 2121 is in an RRC connected state with the BS through the first TRP 2111.

In a step S2100, the BS may transmit a TAG information message to the UE 2121 through the first TRP 2111 to which the UE 2121 is connected. According to an exemplary embodiment of the present disclosure, the TAG information message may be included in an SIB and commonly delivered to all UEs belonging to a cell. According to another exemplary embodiment of the present disclosure, the TAG information message may be delivered individually to each UE. When the TAG information message is delivered individually to each UE, any one of an RRC message, MAC CE, or DCI may be used.

The TAG information message may include at least one of a TAG ID for identifying a TA group (TAG), index (SSB index) of a beam belonging to a TAG ID, cell ID (PCI), index of a preamble belonging to a TAG ID, or index of a TRP belonging to a TAG ID. Additionally, the TAG ID according to the present disclosure may variously identify an SSB group, preamble group, TRP group, and/or the like. In an exemplary embodiment according to the present disclosure, each TAG ID may be mapped to each TRP. In another exemplary embodiment according to the present disclosure, each TAG ID may be logically distinguished.

When a TAG ID is mapped to each TRP, SSBs belonging to the first TRP (i.e. TRP1) may be mapped to a TAG1, SSBs belonging to the second TRP (i.e. TRP2) may be mapped to a TAG2, and SSBs belonging to the third TRP (i.e. TRP3) may be mapped to a TAG3, such as TRP1=TAG1 {SSB0, SSB1, SSB2}, TRP2=TAG2 {SSB3, SSB4, SSB5}, TRP3=TAG3 {SSB6, SSB7, SSB8}. For convenience of description, the following description will assume that one TAG is mapped to one TRP. However, it should be noted that this is for convenience of understanding and a TAG according to the present disclosure is not limitedly mapped to one TRP. In other words, multiple TRPs may be mapped to one TAG, and one TRP may belong to multiple TAGs. For example, one beam (SSB1) of the first TRP may belong to a first TAG, and another beam (SSB2) of the first TRP may belong to a second TAG. In the above-described manner, beams belonging to one TRP may belong to different TAGs. Additionally, one beam (SSB3) belonging to the second TRP may belong to the first TAG. In other words, beams belonging to one TRP may belong to different TAGs, and beams belonging to different TRPs may belong to one TAG.

In a step S2102, the BS may transmit an SSB search request message to the UE 1721 through the first TRP 2111. Accordingly, in the step S2102, the UE 2121 may receive the SSB search request message from the first TRP 2111. The SSB search request message may be transmitted using an RRC message, MAC CE, or DCI message. The SSB search request message may include an SSB search IE as previously described in FIG. 10. The SSB search request message may further include TAG ID(s).

In a step S2102, the UE 2121 may receive the SSB search request message from the BS through the first TRP 2111. The UE 2121 may determine a range in which to perform cell search using the SSB search IE and TAG ID(s) included in the SSB search request message. In other words, the UE 2121 may recognize beams indicated by the TAG ID(s) from previously received information on TAG(s). Therefore, the UE 2121 may identify beams for cell search using the TAG ID(s) included in the SSB search request message.

The BS may include a TAG ID of beams belonging to the second TRP 2112 rather than the first TRP 2111 in the SSB search request message. For example, if the BS wants to performs SSB search only for the second TRP belonging to the TAG2 and does not want to perform SSB search for the third TRP (not shown in FIG. 21) belonging to the TAG3, all SSB indexes of the third TRP need to be included in an SSB search exclusion list. However, by providing information on TAGs to the UE 2121 in advance, the BS may transmit the SSB search request message including only TAG ID(s) for which SSB search is required. Based thereon, the UE 2121 may perform search only on beams corresponding to TAG ID(s) included in the SSB search request message. The information on the TAG ID(s) may be indicated through an additional field in the SSB search options.

The SSB search option described in FIG. 21 may be as follows.

[SSB Search Options]

- SSB search exclusion list: The UE should not search for SSB indexes included in this field. When delivered initially to the UE, this field may include only SSB indexes currently being serviced by the first TRP or may include only SSB indexes belonging to the first TRP. If SSB indexes belonging to the first TRP are included here, it means that services will not be provided through beams belonging to the first TRP (i.e. they are not targets for the SSB search according to the present disclosure).
- Inter-cell SSB: This is an option that indicates whether to perform search including inter-cell SSBs. If this value is disabled, the UE searches only for SSBs of TRPs belonging to the BS (i.e. searches only for SSBs with the same PCI), and if this value is enabled, the UE also searches for SSBs of TRPs of neighbor cells.

The maximum number of SSBs: This indicates the maximum number of SSBs reported by the UE. The UE reports SSBs that are smaller than or equal to this value among all SSBs.

□ Reporting Options

Order: This indicates a reporting order of SSB indexes reported by the UE to the base station. For example, the reporting order may be an order in which a signal strength is large, an order in which a signal strength is small, or the like.

Metric: This indicates whether to include various metrics such as CQI and RSSI.

PCI: This indicates whether to report an SSB index and a PCI together when the inter-cell SSB option is enabled.

PDCCH order execution result report: This indicates whether to report a result of executing a PDCCH order for a selected SSB. When this value is set, contents to be reported may be indicated in subfield(s) below.

TA: TA value for a beam connected after PDCCH order execution.

Metric: Signal measurement values such as CQI and RSSI for a beam connected after PDCCH order execution.

Best SSB index: A subfield that indicates to report information on the best SSB index Others Others TAG ID: This indicates a TAG ID for which SSB search is to be performed. This may include multiple TAG IDs or may not include a specific TAG ID. If this field is set to 'N/A', the TAG ID field is ignored.

As illustrated above, the SSB search options based on FIG. 21 additionally include the TAG ID field in addition to the fields described above. Additionally, it can be seen that the best SSB index field is further included in the subfields of the reporting options.

When the TAG ID option is not used, the TAG ID field is not included or it may be set to 'N/A'. Among the SSB search options and/or reporting options in the SSB search options may be used alone or only in part.

In a step S2104, the second TRP 2112 may transmit SSBs based on an SSB transmission periodicity. Accordingly, in the step S2104, the UE 2121 may receive SSB(s) transmitted by the second TRP 2112.

In a step S2106, the UE 2121 may search only for SSBs belonging to the TAG ID among the SSBs transmitted by the second TRP 2112. The UE 2121 may store information on a predetermined number of beams, such as the best beam and the second best beam that can be used to connect to the BS, among the searched SSBs. Here, the best SSB may be an SSB with the greatest received signal strength among received SSBs whose received signal strength is greater than or equal to a predetermined threshold. The second best beam SSB may be an SSB with the second greatest received signal strength among the received SSBs whose received signal strength is greater than or equal to the predetermined threshold. In FIG. 21, it is assumed that information on the best beam and the second best beam is stored in the UE 2121.

In a step S2108, the UE 2121 may transmit an SSB search result report message to the BS through the first TRP 2111. In this case, the SSB search result report message may include information on the best beam (i.e. SSB1) and the second best beam (i.e. SSB2).

In a step S2108, the BS may receive the SSB search result report message through the first TRP 2111. Accordingly, the BS may select one SSB among the SSBs included in the SSB search result report message. FIG. 21 is a diagram assuming a case where the SSB1 is selected.

In a step S2110, the BS may transmit a PDCCH order to the UE 2121 through the first TRP 2111. The PDCCH order may include an index of the SSB1 selected by the BS and a preamble index. The case of transmitting the preamble index may correspond to a case where the UE 2121 transmits a preamble based on the CFRA scheme.

In a step S2112, the UE 2121 may transmit a preamble to the second TRP 2112 based on the information included in the PDCCH order. Accordingly, the second TRP 2112 may receive the preamble from the UE 2121.

In a step S2114, the second TRP 2112 may transmit a response message corresponding to the SSB1 to the UE 2121. The response message may include a TA value (i.e. TA2).

In a step S2116, the UE 2121 may or may not transmit a PDCCH order execution result report message based on the reporting options included in the search options of the SSB search request message. Here, the case of transmitting the PDCCH order execution result report message may correspond to a case where the corresponding reporting option included in the search options of the SSB search request message is enabled, and the case of not transmitting the PDCCH order execution result report message may correspond to a case where the corresponding reporting option included in the search options of the SSB search request message is disabled.

In addition, the TRPs 2111 and 2112 and the UE 2121 illustrated in FIG. 21 may have the same components as the components previously described in FIG. 2 or may include at least some of the components.

Figure 22:
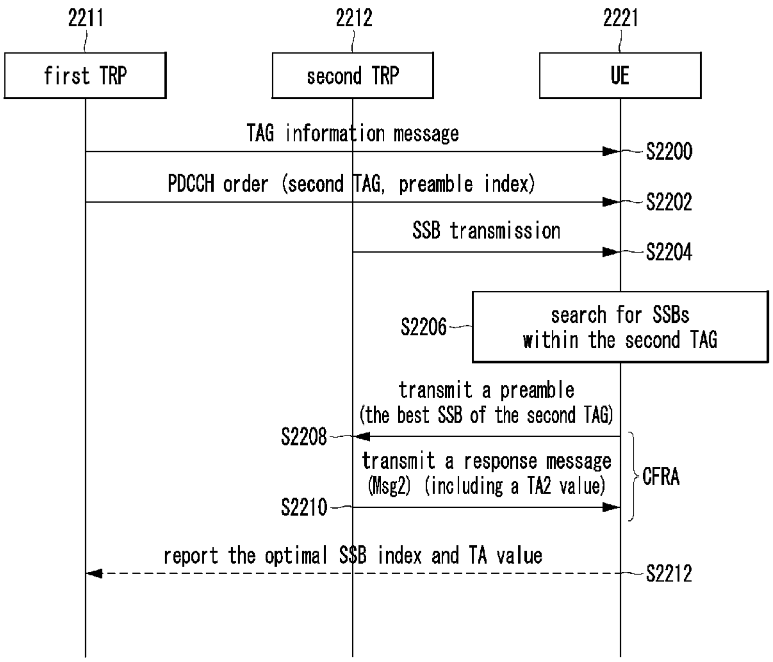
FIG. 22 is a sequence chart according to another exemplary embodiment for a case where a BS transmits TAG information to a UE and the UE uses two beams belonging to different TRPs.

FIG. 22 is a sequence chart according to another exemplary embodiment for a case where a BS transmits TAG information to a UE and the UE uses two beams belonging to different TRPs.

In FIG. 22, it is assumed that a first TRP 2211 and a second TRP 2212 are TRPs belonging to a BS (not shown in FIG. 22). In other words, it is assumed that the first TRP 2211 and the second TRP 2212 are connected below the BS. Additionally, it is assumed that the UE 2222 is in an RRC connected state with the BS through the first TRP 2211.

In a step S2200, the BS may transmit a TAG information message to the UE 2222 through the first TRP 2211 to which the UE 2222 is connected. According to an exemplary embodiment of the present disclosure, the TAG information message may be included in an SIB and commonly delivered to all UEs belonging to a cell or may be delivered individually to each UE. The TAG information message may include at least one of a TAG ID for identifying a TA group (TAG), index (SSB index) of a beam belonging to a TAG ID, cell ID (PCI), index of a preamble belonging to a TAG ID, or index of a TRP belonging to a TAG ID. For convenience of description, the following description will assume that one TAG is mapped to one TRP. However, it should be noted that this is for convenience of understanding and a TAG according to the present disclosure is not limitedly mapped to one TRP.

In a step S2202, the BS may transmit a PDCCH order to the UE 2222 through the first TRP 2211. In comparison with FIG. 21 described above, in the case of FIG. 21, the BS transmits an SSB search request message including a TAG ID to the UE. However, in the case of FIG. 22, an SSB search request message is not transmitted to the UE 2222, but a PDCCH order is transmitted to the UE 2222. Therefore, the PDCCH order transmitted by the BS may include a TAG ID instead of an SSB index. This is to allow the UE 2222 to select the best SSB index for the UE 2222 after searching for all SSBs belonging to the TAG ID and initiate a RACH procedure based on the corresponding SSB. Therefore, a preamble index may be further included in the PDCCH order. This is to allow the UE 2221 to transmit a preamble based on the CFRA scheme.

As illustrated in FIG. 22, there is an advantage in that the second TRP 2212 or multi-beams can be quickly configured by omitting the transmission of the SSB search request message and transmission of the search result report message. However, by allowing the TAG ID to be included as a parameter of the PDCCH order, a processing load of the second TRP may increase because the preamble index included in the PDCCH order should be decoded for all SSBs belonging to the corresponding TAG ID.

If a connection between the second TRP and the BS is wired, the above-described configuration may be performed without waste of radio resources. In addition, in the step S2202, the case where the TAG ID of the second TAG is configured in the PDCCH order is exemplified. In other words, the case where only one TAG ID is included in the PDCCH order is exemplified. However, more than one TAG ID may be included in the PDCCH order. For example, the second TAG and third TAG may be included in the PDCCH order. In this case, the UE 2221 may search for all SSBs belonging to the second TAG and the third TAG and then perform a RACH procedure based on the best SSB.

In a step S2204, the second TRP 2212 may transmit SSBs based on an SSB transmission periodicity. Accordingly, the UE 2221 may receive SSB(s) from the second TRP 2212 in the step S2204.

In a step S2206, the UE 2221 may perform SSB search based on the received PDCCH order. In other words, as described above, SSBs may be searched for in beams included in the second TAG. Then, the UE 2221 may select the optimal SSB among the beams included in the second TAG. The optimal SSB may be an SSB with the greatest received signal strength among received SSBs whose received signal strength is greater than or equal to a predetermined threshold.

In a step S2208, the UE 2221 may transmit a preamble to the second TRP 2212 using the preamble index included in the received PDCCH order. In other words, the RACH procedure according to the CFRA scheme may be initiated. In the step S2208, the second TRP 2212 may receive the preamble from the UE 2221 and decode it.

In a step S2210, the second TRP 2212 may transmit a response message including a TA value (TA2) to the UE 2221. Accordingly, the UE 2221 may receive the response message and store the TA value (TA2) included in the response message. The TA2 may then be used by the UE 2221 when transmitting uplink to the second TRP 2212.

In a step S2212, the UE 2221 may transmit the optimal SSB index and TA value to the BS through the first TRP 2211. The optimal SSB index and TA value may be transmitted as being included in a PDCCH order execution result report message. Where the UE 2221 transmits the PDCCH execution result report message may be determined based on the reporting option of the SSB search option, as described above.

In addition, the TRPs 2211, 2212, and 2213 and the UE 2221 illustrated in FIG. 22 may have the same components as the components previously described in FIG. 2 or may include at least some of the components.

According to the exemplary embodiments of the present disclosure described above, in an environment where the UE receives downlink data simultaneously or sequentially from multiple TRPs or transmits uplink data simultaneously or sequentially to multiple TRPs, the UE can determine the optimal TRP(s) and beam(s) to receive services. Additionally, the methods proposed in the present disclosure can prevent resource waste in the TRP selection and TA acquisition process. In particular, through the use of the TAG configuration method, PDCCH order improvement method, SSB search request message, and/or TAG information message according to the present disclosure, multiple beams can be selected flexibly and efficiently, not only in intra-cell scenarios but also in inter-cell scenarios.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a user equipment (UE), comprising:

receiving a first synchronization signal block (SSB) search request message including SSB search options through a first transmission and reception point (TRP) connected to a base station (BS);

searching for a plurality of SSBs based on the SSB search options;

in response to presence of a beam transmitting at least one SSB having a received signal strength equal to or greater than a predetermined threshold as a result of the searching, transmitting a first SSB search result report message to the BS through the first TRP, the first SSB search result report message including information on the at least one SSB having the received signal strength equal to or greater than the predetermined threshold;

receiving a first physical downlink control channel (PDCCH) order including an SSB index and a preamble index from the first TRP; and performing a random access procedure with a second TRP transmitting a beam corresponding to the SSB index included in the first PDCCH order, wherein the SSB search options include at least one of a field indicating an SSB search exclusion list, a field indicating inter-cell SSB search, a field indicating a maximum number of SSBs reported by the UE, or a reporting option field indicating whether to report on the searching based on the SSB search options.

2. The method according to claim 1, wherein the reporting option field includes at least one of a subfield indicating a reporting order of SSB indexes reported by the UE to the BS, a subfield indicating whether to include a metric to be used when reporting the SSB indexes, a subfield indicating whether to report a physical cell identity together with the SSB indexes, a subfield indicating whether to report a result of executing the first PDCCH order, a subfield indicating whether to report a timing advance (TA) value for a beam additionally connected with the UE based on the first PDCCH order, or a subfield indicating whether to include a metric for the beam additionally connected with the UE based on the first PDCCH order.

3. The method according to claim 1, further comprising:

in response to identifying no SSB having a received signal strength equal to or greater than the predetermined threshold as a result of the searching, transmitting SSB index search failure information by including the SSB index search failure information in the SSB search result report message;

receiving a second SSB search request message including changed SSB search options from the first TRP;

searching for a plurality of SSBs based on the changed SSB search options included in the second SSB search request message;

in response to presence of a beam transmitting at least one SSB having a received signal strength equal to or greater than the predetermined threshold as a result of the searching based on the changed SSB search options, transmitting a second SSB search result report message including information on the at least one SSB having the received signal strength equal to or greater than the predetermined threshold to the BS through the first TRP;

receiving a second PDCCH order including an SSB index and a preamble index from the first TRP; and performing a random access procedure with a second TRP transmitting a beam corresponding to the SSB index included in the second PDCCH order.

4. The method according to claim 3, wherein the random access procedure with the second TRP comprises:

transmitting a preamble corresponding to the preamble index included in the second PDCCH order to the second TRP; and receiving a response signal including a timing advance (TA) value from the second TRP.

5. The method according to claim 4, further comprising: when a reporting option field of the SSB search options is set to allow the UE to report a TA value for a beam additionally connected based on the first PDCCH order after executing the first PDCCH order, transmitting a TA value obtained from the second TRP to the first TRP by including the TA value in a report message of a result after executing the first PDCCH order.

6. The method according to claim 1, wherein when a physical cell identity (PCI) of the second TRP is different from a PCI of the first TRP, the first PDCCH order further includes the PCI of the second TRP.

7. A method of a user equipment (UE), comprising:

receiving a message including information on timing advance group(s) (TAG(s)) through a first transmission and reception point (TRP) connected to a base station (BS);

receiving a first synchronization signal block (SSB) search request message including SSB search options for searching for SSBs of a second TRP;

searching for a plurality of SSBs based on the SSB search options;

in response to presence of a beam transmitting at least one SSB having a received signal strength equal to or greater than a predetermined threshold as a result of the searching, transmitting a first SSB search result report message to the BS through the first TRP, the first SSB search result report message including information on the at least one SSB having the received signal strength equal to or greater than the predetermined threshold;

receiving a physical downlink control channel (PDCCH) order including a preamble index for accessing the second TRP from the first TRP; and performing a random access procedure with the second TRP based on the PDCCH order.

8. The method according to claim 7, wherein the SSB search options further include a TAG identifier based on the information on the TAG(s).

9. The method according to claim 7, wherein the PDCCH order includes one of indexes of SSBs included in the first SSB search result report message.

10. The method according to claim 7, wherein the PDCCH order further includes a TAG identifier based on the information on the TAG(s).

* * * * *